US010721765B2

(12) United States Patent
Park

(10) Patent No.: US 10,721,765 B2
(45) Date of Patent: Jul. 21, 2020

(54) METHOD AND APPARATUS FOR SWITCHING BANDWIDTH PART IN NEW RADIO

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/147,638

(22) Filed: Sep. 29, 2018

(65) Prior Publication Data

US 2019/0104543 A1    Apr. 4, 2019

(30) Foreign Application Priority Data

Sep. 29, 2017  (KR) .................. 10-2017-0128177
Nov. 30, 2017  (KR) .................. 10-2017-0162692

(Continued)

(51) Int. Cl.
*H04W 74/00* (2009.01)
*H04W 8/24* (2009.01)
(Continued)

(52) U.S. Cl.
CPC ........... *H04W 74/006* (2013.01); *H04L 1/001* (2013.01); *H04L 1/1671* (2013.01);
(Continued)

(58) Field of Classification Search
CPC . H04W 74/006; H04W 72/0453; H04W 8/24; H04W 72/0486; H04W 72/1289;
(Continued)

(56) References Cited

U.S. PATENT DOCUMENTS 10,284,404 B2 * 5/2019 Park .................... H04L 27/2613
2016/0127991 A1   5/2016 Ang et al.
(Continued)

FOREIGN PATENT DOCUMENTS

KR   10-2017-0080587 A   7/2017

OTHER PUBLICATIONS

Samsung, "Wider Bandwidth Operations", R1-1713654, 3GPP TSG RAN WG1 NR Meeting# 90, Prague, Czech Republic, Aug. 21-26, 2017, pp. 1-9.

(Continued)

*Primary Examiner* — Walli Z Butt
(74) *Attorney, Agent, or Firm* — IP Legal Services, LLC

(57) ABSTRACT

Provides are a method and apparatus for scheduling a data channel to support a user equipment (UE) using various bandwidth parts (BWPs) in a next-generation/5G radio access network. The method may include transmitting information on physical layer capability, which includes information on a BWP switching delay type; receiving downlink control information (DCI) including a BWP indication field that indicates one BWP different from an active BWP among BWPs included in a BWP set configured for the UE, and scheduling control information for a data channel; activating a BWP indicated by a value of the BWP indication field in consideration of a transition time determined by the information on the BWP switching delay type; and transceiving the data channel according to the scheduling control information.

15 Claims, 16 Drawing Sheets

| (30) | Foreign Application Priority Data |
|---|---|
| Jul. 20, 2018 (KR) .................. 10-2018-0084727 | |
| Aug. 8, 2018 (KR) .................. 10-2018-0092635 | |

(51) Int. Cl.
| | | |
|---|---|---|
| *H04L 1/00* | (2006.01) | |
| *H04W 72/04* | (2009.01) | |
| *H04L 1/18* | (2006.01) | |
| *H04L 1/16* | (2006.01) | |
| *H04W 72/12* | (2009.01) | |

(52) U.S. Cl.
CPC ............ *H04L 1/1854* (2013.01); *H04W 8/24* (2013.01); *H04W 72/0453* (2013.01); *H04W 72/0486* (2013.01); *H04W 72/1289* (2013.01)

(58) Field of Classification Search
CPC .. H04W 72/042; H04L 1/1671; H04L 1/1854; H04L 1/001; H04L 5/0053
See application file for complete search history.

(56) References Cited

U.S. PATENT DOCUMENTS

| | | |
|---|---|---|
| 2017/0111860 A1 | 4/2017 | Ang et al. |
| 2017/0280387 A1 | 9/2017 | Ang et al. |
| 2017/0367099 A1* | 12/2017 | Cariou .................. H04W 72/08 |
| 2018/0367386 A1* | 12/2018 | Liao ...................... H04L 5/0048 |
| 2018/0368112 A1* | 12/2018 | Sebeni ................ H04W 72/042 |
| 2019/0045491 A1* | 2/2019 | Zhang ............... H04W 72/1289 |
| 2019/0082388 A1 | 3/2019 | Ang et al. |
| 2019/0090299 A1* | 3/2019 | Ang ...................... H04W 36/06 |
| 2019/0215212 A1* | 7/2019 | Park ........................ H04L 5/005 |

OTHER PUBLICATIONS

Vivo, "Remaining details for bandwidth part operation", R1-1715648, 3GPP TSG RAN WG1 NR AH#3, Nagoya, Japan, Sep. 18-21, 2017, pp. 1-3.

* cited by examiner

FIG.3
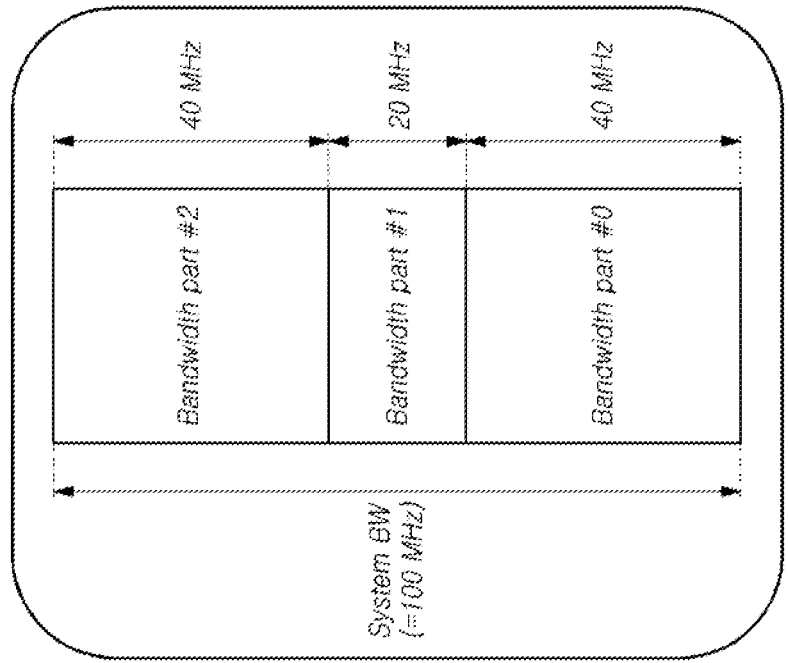
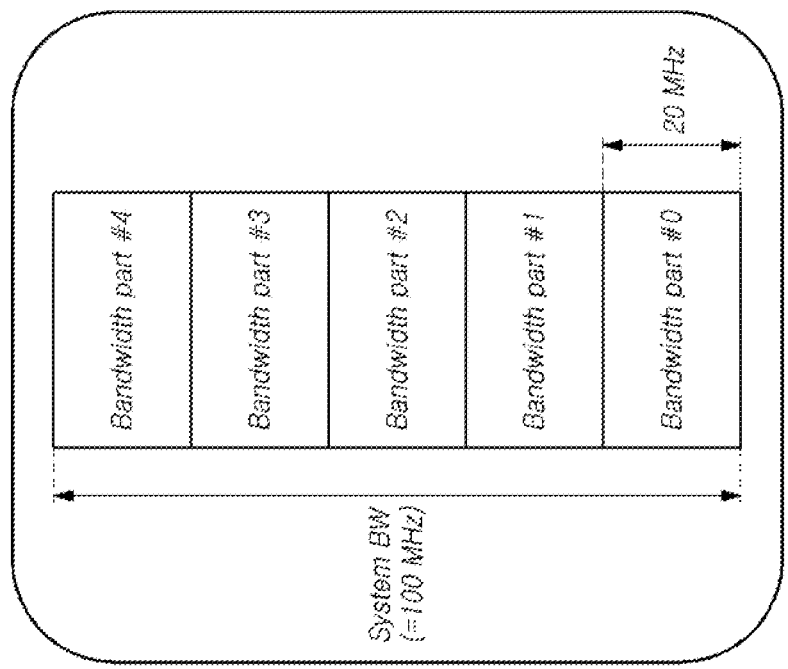

FIG.9

| ... | BIF | ... | scheduling control information | ... |

DCI 1_1

*FIG.10*

DCI 0_1

| ... | BIF | ... | scheduling control information | ... |

METHOD AND APPARATUS FOR SWITCHING BANDWIDTH PART IN NEW RADIO

CROSS REFERENCE TO RELATED APPLICATION

This application claims priority from Korean Patent Applications No. 10-2017-0128177, filed on Sep. 29, 2017, No. 10-2017-0162692, filed on Nov. 30, 2017, No. 10-2018-0084727, filed on Jul. 20, 2018 & No. 10-2018-0092635, filed on Aug. 8, 2018, which are hereby incorporated by reference for all purposes as if fully set forth herein.

BACKGROUND OF THE INVENTION

1. Field of the Invention

The embodiments propose a method and apparatus for switching a bandwidth part to support a user equipment (UE) using various bandwidth parts (BWPs) in a next-generation radio access network (hereinafter, referred to as a new radio (NR)).

2. Description of the Prior Art

Recently, the 3rd generation partnership project (3GPP) has approved the "Study on New Radio Access Technology", which is a study item for research on next-generation technology (5G radio access technology), on the basis of which Radio Access Network Working Group 1 (RAN WG1) has been designing frame structures, channel coding and modulation, waveforms, and multiple access methods for a new radio (NR). NR is required to be designed not only to provide an improved data transmission rate as compared with that of long term evolution (LTE)/LTE-Advanced, but also to satisfy various requirements in detailed and specific usage scenarios.

An enhanced mobile broadband (eMBB), massive machine-type communication (mMTC), and ultra reliable and low latency communication (URLLC) are proposed as typical usage scenarios for the NR. In order to meet the requirements of the individual scenarios, it is required to design flexible frame structures when compared to those of LTE/LTE-Advanced.

In particular, when a UE uses various BWPs in the NR, there is an increasing need of setting up a specific and efficient method for switching to the BWP suitable for the UE or communication environment.

SUMMARY OF THE INVENTION

Aspects of embodiments are directed to providing a method of configuring and activating a BWP suitable for the UE or communication environment for transceiving a data channel between a UE and a base station (BS) in a next-generation radio network.

According to an aspect of the present disclosure, there is provided a method of switching bandwidth part (BWP) by a UE, the method including: transmitting information on physical layer capability including information on a BWP switching delay type, receiving downlink control information (DCI) including a BWP indication field that indicates one BWP different from an active BWP among BWPs included in a BWP set configured for the UE, and scheduling control information for a data channel, activating the BWP indicated by the value of the BWP indication field in consideration of a transition time determined by the information on the BWP switching delay type, and transceiving the data channel according to the scheduling control information.

According to another aspect of the present disclosure, there is provided a method of switching bandwidth part (BWP) by a BS, the method including: receiving information on physical layer capability including information on BWP switching delay type, from the UE, determining BWP indication field indicating one BWP different from an active BWP among BWPs included in a BWP set configured for the UE, transmitting downlink control information (DCI) including the BWP indication field and scheduling control information for a data channel, and transceiving the data channel according to the scheduling control information if the BWP indicated by a value of the BWP indication field is activated in consideration of a transition time determined by the information on the BWP switching delay type.

According to still another aspect of the present disclosure, there is provided a UE for switching bandwidth part (BWP), the UE including: a transmitter which transmits information on physical layer capability including information on BWP switching delay type, a receiver which receives downlink control information (DCI) including BWP indication field indicating one BWP different from an active BWP among BWPs included in a BWP set configured for the UE, and scheduling control information for a data channel, and a controller which activates the BWP indicated by a value of the BWP indication field in consideration of a transition time determined by the information on the BWP switching delay type, and controls the transmitter and the receiver in order to transceive the data channel according to the scheduling control information.

According to yet another aspect of the present disclosure, there is provided a BS for switching bandwidth part (BWP), the BS including: a receiver which receives information on physical layer capability including information on BWP switching delay type, from the UE, the controller which determines BWP indication field indicating one BWP different from an active BWP among BWPs included in a BWP set configured for the UE, and controls the transmitter and the receiver in order to transceive the data channel according to the scheduling control information if the BWP indicated by a value of the BWP indication field is activated in consideration of a transition time determined by the information on the BWP switching delay type, and a transmitter which transmits downlink control information (DCI) including the BWP indication field and scheduling control information for a data channel.

In accordance with the embodiments, a BWP may be configured and activated for the UE or communication environment in order to transmit and receive a data channel between a UE and a base station (BS) in a next-generation radio network.

BRIEF DESCRIPTION OF THE DRAWINGS

The above and other aspects, features and advantages of the present disclosure will be more apparent from the following detailed description taken in conjunction with the accompanying drawings, in which:

FIG. 3 is a diagram for describing configuring a plurality of BWPs according to an embodiment;

FIGS. 9 and 10 are diagrams for describing including a BWP indication field in a DCI according to a DCI format according to an embodiment;

DETAILED DESCRIPTION OF THE EXEMPLARY EMBODIMENTS

Figure 1:
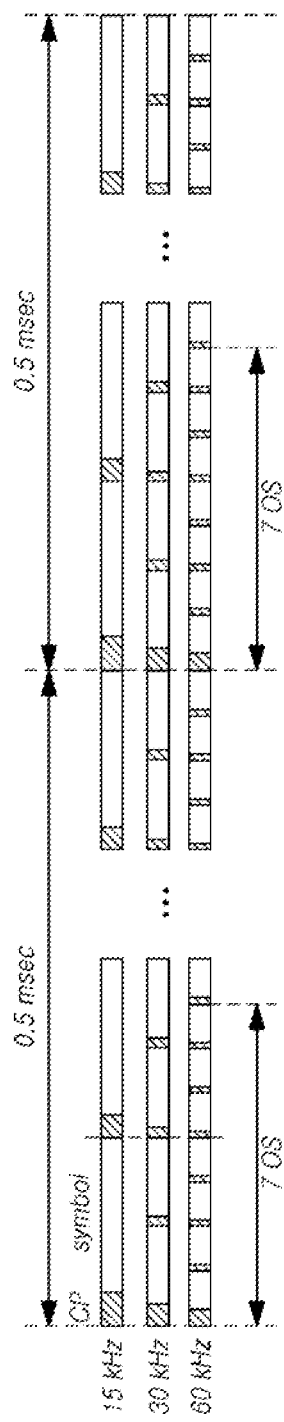
FIG. 1 is a diagram for describing arrangements of orthogonal frequency division multiple (OFDM) symbols when subcarrier spacings, which are different from each other, are used according to embodiments.

Hereinafter, embodiments of the present disclosure will be described in detail with reference to the accompanying drawings. In adding reference numerals to elements in each drawing, the same elements may be designated by the same reference numerals although the same elements are shown in different drawings. Further, in the following description of the present disclosure, detailed descriptions of functions and configurations related to the known structure may be omitted when it is determined that the descriptions may obscure the gist of the present disclosure.

In the present disclosure, a wireless communication system refers to a system for providing various communication services such as a voice service, a packet data service, etc. The wireless communication system may include a user equipment (UE) and a base station (BS).

The UE may be a comprehensive concept that indicates a terminal for use in wireless communication, including a UE used for wideband code division multiple access (WCDMA), long term evolution (LTE), high speed packet access (HSPA), IMT-2020 (5G or new radio), or the like, and a mobile station (MS), a user terminal (UT), a subscriber station (SS), a wireless device, or the like used for a global system for mobile communications (GSM).

The BS or a cell generally refers to a station where communication with a UE is performed, and the BS or the cell inclusively means all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the above-described various cells have a BS that controls a corresponding cell. Thus, the BS may be construed in two ways. 1) The BS may be a device that provides the megacell, the macrocell, the microcell, the picocell, the femtocell, and the small cell in association with a wireless area, or 2) the BS may indicate the wireless area itself. In item 1), the base station may be a) devices that interact with another device and controlled by an identical entity to provide a predetermined wireless area or b) devices that cooperate with each other to configure the wireless area. Based on a configuration type of the wireless area, the base station may be a point, a transmission/reception point, a transmission point, a reception point, or the like. In item 2), the base station may be the wireless area itself that receives or transmits a signal from a perspective of the UE or a neighboring BS.

In the present disclosure, the cell may refer to the coverage of a signal transmitted from the transmission/reception point, a component carrier having the coverage of the signal transmitted from the transmission/reception point (transmission point or transmission/reception point), or the transmission/reception point itself.

In the present disclosure, the UE and the BS are used as two (uplink and downlink) inclusive transceiving subjects to embody the technology and technical concepts described in the specifications and may not be limited to a specific term or word.

Here, a term uplink (UL) refers to a scheme for the UE to transceive data to the BS, and a term downlink (DL) refers to a scheme for the BS to transceive data to the UE.

UL transmission and DL transmission may be performed using i) a time division duplex (TDD) scheme that performs transmission based on different times, ii) a frequency division duplex (FDD) scheme that performs transmission based on different frequencies, or iii) a mixed scheme of the TDD and FDD schemes.

Further, a related standard of the wireless communication system may define to form a UL and a DL based on a single carrier or a pair of carriers.

The UL and the DL may transmit control information through a control channel, such as a physical DL control channel (PDCCH), physical UL control channel (PUCCH), and the like. The UL and the DL may transmit data information through a data channel, such as a physical DL shared channel (PDSCH), physical UL shared channel (PUSCH), and the like 5 gb.

The DL may refer to communication or a communication path from a multi-transmission/reception point to the UE, and the UL may refer to communication or the communication path from the UE to a multi-transmission/reception point. In the DL, a transmitter may be a part of multiple transmission/reception points and a receiver may be a part of the UE. In the UL, a transmitter may be a part of the UE and a receiver may be a part of multiple transmission/reception points.

Hereinafter, signal transmission and reception through a channel such as the PUCCH, the PUSCH, the PDCCH, or the PDSCH will be expressed as the transmission and reception of the PUCCH, the PUSCH, the PDCCH, or the PDSCH.

Meanwhile, higher layer signaling includes a radio resource control (RRC) signaling that transmits RRC information including an RRC parameter.

The BS performs DL transmission on the UEs. The BS may transmit a physical DL control channel for transmitting i) DL control information such as scheduling required to receive a DL data channel, which is a main physical channel for unicast transmission, and ii) scheduling approval information for transmission on a UL data channel. Hereinafter, signal transmission and reception through each channel will be described as transmission and reception of a corresponding channel.

Varied multiple access schemes may be unrestrictedly applied to the wireless communication system. Various multiple access schemes may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, and the like. Here, NOMA includes sparse code multiple access (SCMA), low cost spreading (LDS), and the like.

Embodiments of the present disclosure may be applicable to resource allocation in an asynchronous wireless communication scheme that evolves into LTE/LTE-advanced and IMT-2020 through GSM, WCDMA, and HSPA and may be applicable to resource allocation in a synchronous wireless communication scheme that evolves into CDMA, CDMA-2000, and UMB.

In the present disclosure, a machine type communication (MTC) UE refers to a UE that is low cost (or low complexity), a UE that supports coverage enhancement, or the like. Alternatively, in the present disclosure, the MTC UE refers to a UE that is defined in a predetermined category for maintaining low costs (or low complexity) and/or coverage enhancement.

In other words, in the present disclosure, the MTC UE may refer to a newly defined 3GPP Release-13 low cost (or low complexity) UE category/type which executes LTE-based MTC related operations. Alternatively, in the present disclosure, the MTC UE may refer to a UE category/type that is defined in or before 3GPP Release-12 that supports the enhanced coverage in comparison with the existing LTE coverage or supports low power consumption, or may refer to a newly defined Release-13 low cost (or low complexity) UE category/type. Alternatively, the MTC UE may refer to a further enhanced MTC UE defined in Release-14.

In the present disclosure, a narrowband Internet of Things (NB-IoT) UE refers to a UE supporting radio access for cellular IoT. NB-IoT technology is aimed at indoor coverage improvement, support for large-scale low-speed UEs, low latency sensitivity, very low UE costs, low power consumption, and optimized network architecture.

An enhanced mobile broadband (eMBB), massive machine-type communication (mMTC), and ultra reliable and low latency communication (URLLC) are proposed as typical usage scenarios for NR which have been under discussion in the 3GPP in recent years.

In the present disclosure, a frequency, a frame, a subframe, a resource, a resource block (RB), a region, a band, a sub-band, a control channel, a data channel, a synchronization signal, various reference signals, various signals, and various messages associated with NR may be interpreted as meanings used in the past or present or as various meanings to be used in the future.

In the present disclosure, embodiments are described based on two nodes of the UE and the BS. However, this is for the sake of understanding, and the same technical idea can be applied between the UE and the UE. For example, the BS described below has been exemplarily described as a node that performs communication with the UE. Such a base station may be replaced with another UE(s) or an infrastructure device(s) that performs communication with the UE as needed.

That is, embodiments of the present disclosure may be applied not only to the communication between the UE and the BS but also to the device to device communication, the side link communication (Sidelink), the vehicle communication (V2X) and the like. In particular, the present disclosure may be applied to inter-UE communication in the next generation radio access technology. Terms such as signal and channel in the present disclosure may be variously modified and applied according to the type of communication between UEs.

For example, the Primary Synchronization Signal (PSS) and the Secondary Synchronization Signal (SSS) may be applied to the inter-UE communication by changing the terms as Primary Sidelink Synchronization Signal (PSSS) and Secondary Sidelink Synchronization Signal (SSSS), respectively. The channel for transmitting broadcast information such as the above-described PBCH is a PSBCH (Physical Sidelink broadcasting Channel), and the channel for transmitting data on the side link is a PSSCH (Physical Sidelink Shared Channel) such as a PUSCH and a PDSCH, and a channel for transmitting control information such as a PDCCH and a PUCCH is changed to a PSCCH (Physical Sidelink Control Channel). On the other hand, a discovery signal is required for inter-UE communication, which is transmitted/received via the PSDCH. However, the present disclosure is not limited to these terms.

Hereinafter, embodiments of the present disclosure will be described with reference to the communication between the UE and the BS, but may be applied as the BS node is replaced with another UE as needed.

New Radio Access Technology (NR)

Recently, the 3GPP has approved the "Study on New Radio Access Technology", which is a study item for research on next-generation (5G radio access technology), on the basis of which designs about frame structure, channel coding & modulation, waveform, multiple access scheme, etc. have been discussed.

NR is required to be designed not only to provide a data transmission rate improved as compared with that of LTE/LTE-Advanced, but also to satisfy various requirements in detailed and specific usage scenarios. In particular, an eMBB, mMTC, and URLLC have been given as representative usage scenarios of the NR, and it has been required to design more flexible frame structures as compared with those for LTE/LTE-Advanced in order to satisfy the requirements of each individual scenario.

Specifically, the eMBB, mMTC and URLLC have been taken into account for the representative usage scenarios of the NR being discussed in the 3GPP. Since the usage scenarios are different from one another in terms of requirements for data rates, latency, coverage, etc., necessity for a method of efficiently multiplexing radio resource units based on different kinds of numerology (e.g., a subcarrier spacing (SCS), a subframe, a transmission time interval (TTI), etc.) has been proposed as a method of efficiently satisfying requirements according to usage scenarios through a frequency band of a NR system.

To this end, discussions have been conducted for a method of multiplexing and supporting numerology having different values of SCS based on TDM, FDM or TDM/FDM through one NR carrier, and a method of supporting one or more time units in forming scheduling units in a time domain. In this regard, the NR has defined a subframe as a kind of time domain structure, and a single subframe duration configured with 14 OFDM symbols of 15 kHz SCS-based normal CP overhead like the LTE as reference numerology to define the corresponding subframe duration. Therefore, the subframe in the NR may have a time duration of 1 ms. However, unlike the LTE, the subframe of the NR may have a slot and a mini-slot defined as an actual UL/DL data scheduling-based time unit, which is an absolute reference time duration. In this case, the number of OFDM symbols for forming the corresponding slot, i.e., a value of y, has been defined as y=14 in the case of normal CP regardless of the numerology.

Therefore, a slot may include 14 symbols. In accordance with transmission directions for the corresponding slot, any of the symbols may be used for DL transmission or UL transmission, or the symbols may be used in the form of a DL portion+a gap+a UL portion.

Further, a mini-slot configured with fewer symbols than those of the corresponding slot may be defined in certain numerology (or SCS), and a short time domain scheduling interval for transmitting and receiving UL/DL data may be set based on the mini-slot. Also, a long time domain scheduling interval for transmitting and receiving UL/DL data may be configured by slot aggregation.

Particularly, in the case of transmitting and receiving latency critical data like the URLLC, when the scheduling is achieved in units of slots based on 1 ms (14 symbols) defined in a frame structure based on the numerology having a small SCS value like 15 kHz, latency requirements may be difficult to satisfy with the scheduling. To this end, the mini-slot having fewer OFDM symbols than those of the corresponding slot is defined, and thus the scheduling for the latency critical data like the URLLC may be achieved based on the mini-slot.

Further, as described above, there have been discussions for a method of scheduling data in accordance with latency requirements based on the length of the slot (or mini-slot) defined in each individual numerology by using the TDM or FDM method to multiplex and support the numerology having different SCS values within one NR carrier. For example, as shown in FIG. 1, the length of a symbol for 60 kHz SCS is shortened by a fourth of that for 15 kHz SCS, and thus a 60 kHz-based slot is shortened to have a length of about 0.25 ms as compared with a 15 kHz-based slot having a length of 1 ms under the same condition that one slot is configured with 14 OFDM symbols.

As described above, a method of satisfying each requirement of URLLC and eMBB has been under discussion by defining different SCS or different TTI length in the NR.

Wider Bandwidth Operations

The typical LTE system supports a scalable bandwidth operation with regard to a LTE component carrier (CC). That is, in accordance with frequency deployment scenarios, a LTE business operator sets and uses a bandwidth within a range of the minimum of 1.4 MHz to the maximum of 20 MHz in terms of configuring one LTE CC. Therefore, atypical LTE UE supports a transceiving bandwidth capability of 20 MHz with respect to one LTE CC.

Figure 2:
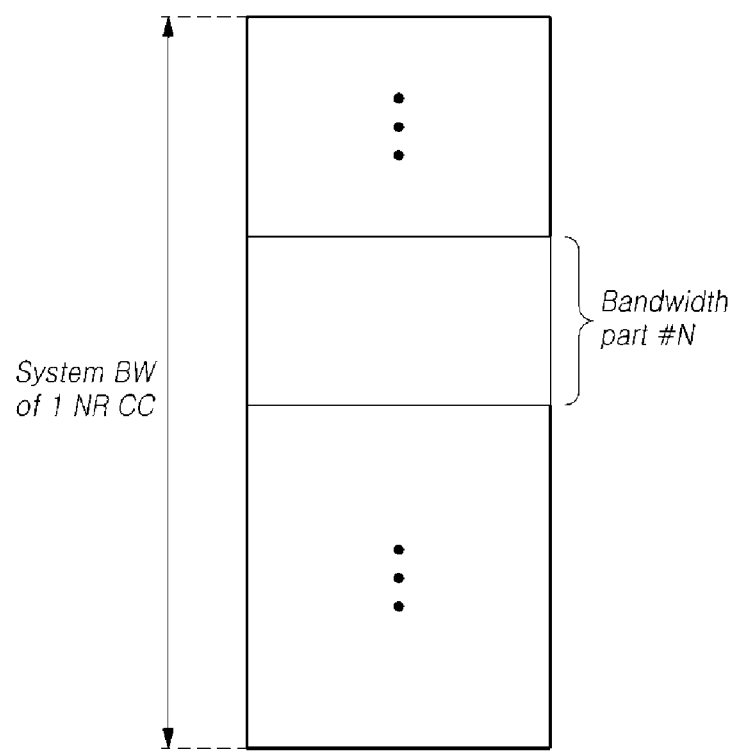
FIG. 2 is a diagram for describing a bandwidth part (BWP) according to an embodiment.

On the other hand, the NR has been designed to support NR UEs having different transceiving bandwidth capabilities through one wideband NR CC. Accordingly, the NR is required to configure one or more BWPs divided into many bandwidths with respect to a NR CC and set and activate the BWPs differently according to the UEs to thereby support a flexible wider bandwidth operation as shown in FIG. 2.

Like this, it may be defined that a NR CC may be divided into one or more BWPs, the one or more BWPs are configured for each individual UE, and a UL/DL radio signal and channel for a UE is transceived by activating at least one BWP among one or more BWPs configured for the corresponding UE.

Specifically, in NR, one or more BWPs may be configured through one serving cell configured from the UE perspective. The corresponding UE may activate one downlink BWP (DL BWP) and one uplink BWP (UL BWP) in the corresponding serving cell to be used for uplink/downlink data transmission/reception. Also, when a UE is set to cooperate with a plurality of serving cells (e.g., when the UE performs the CA operation), one DL BWP or UL BWP may be activated for each serving cell. Therefore, the radio resource such as one DL BWP or UL BWP for each serving cell may be used for uplink/downlink data transmission/reception.

Specifically, an initial BWP may be defined for an initial access procedure of the UE in a serving cell, and one or more UE-specific resources may be configured for each UE through dedicated RRC signaling. A default BWP for a fallback operation may be defined for each UE.

However, in a serving cell, a plurality of uplink/downlink BWPs may be defined to be activated and used simultaneously according to the capability and BWP configuration of the UE. In NR rel-15, a UE may be defined to activate and use only one DL BWP and UL BWP at a time.

As described above, in the NR, one or more BWPs can be configured through one serving cell from the UE perspective. Specifically, in the case of a serving cell configured of an unpaired (i.e., TDD) or a paired (i.e., FDD) spectrum according to a transmission direction supported by the corresponding serving cell, at least one DL BWP and the UL BWP may be respectively configured. Further, the BS may activate only one DL BWP and UL BWP at a given time for each UE to be used for transmission/reception of uplink/downlink radio channel and signal (for example, PDCCH/PDSCH, PUSCH/PUCCH, etc.). However, in the case of a downlink-only or uplink-only serving cell, only the DL BWP and the UL BWP may be configured and activated, respectively.

Accordingly, the BWP for the UE may be independently configured and activated for the Scell which is configured through the CA operation in addition to the Pcell which performs the initial access.

In this way, when one or more BWPs are configured in any serving cell for any UE, the UE may activate and use one BWP at any time. Specifically, one BWP among one or more DL BWPs configured for the corresponding UE in the corresponding serving cell may be activate and used for downlink transmission/reception, in a downlink subframe/slot/mini-slot. Similarly, one BWP among one or more UL BWPs configured for the corresponding UE in the corresponding serving cell may be activate and used for uplink transmission/reception, in a uplink subframe/slot/mini-slot.

Accordingly, the BS may configure one or more DL BWPs having different bandwidths and one or more UL BWPs having different bandwidths for a UE, respectively. Also, the BS may activate and use the suitable BWP according to the traffic load of the corresponding UE. In particular, in NR, NR cells may be configured based on extended system bandwidth compared to LTE, and transmission and reception of radio signals and radio channels based on the extended system bandwidth may be a great burden in terms of power consumption of the UE.

In this regard, as described above, when the BS configures and operates the BWP for a UE, the BS configures the BWP having various bandwidths and activates the BWP of a suitable bandwidth according to the traffic load of the UE. Accordingly, the battery power consumption of the UE may be greatly reduced.

For example, when the system bandwidth of a NR cell is 100 MHz, the BS may configure a first BWP of 10 MHz, a second BWP of 20 MHz, a third BWP of 40 MHz, and a fourth BWP of 80 MHz for the corresponding UE, and activate and use the suitable BWP among one of the first to fourth four BWPs according to the traffic load of the corresponding UE in a time so that the power consumption of the RF stage due to a transmission/reception bandwidth (i.e., 100 MHz corresponding to the system bandwidth) based on unnecessary wide bandwidth may be greatly reduced.

In this way, the configuration and indication of the BWP in the NR system may lead to a large gain in terms of battery power consumption of the UE. The present disclosure proposes a specific BWP operating method for this. Specifically, methods may be proposed for configuring a plurality of BWPs and activating and switching the BWP for a UE and for ensuring a BWP transition time.

An activation/deactivation indication of a DL BWP and an UL BWP for a UE may be performed through the DCI transmitted through the PDCCH. Specifically, activation and deactivation of the DL BWP may be performed through a DL assignment DCI including resource allocation information for the PDSCH. Activation and deactivation of the UL BWP may also be performed through an UL grant including resource allocation information for the PUSCH.

In this embodiment, there are proposed a specific operation related to activation/deactivation of an UL/DL BWP, that is, active DL/UL BWP switching through the scheduling DCI which includes scheduling control information, and a method for active DL/UL BWP switching through the DCI which does not include scheduling control information.

However, in the embodiment, the downlink BWP switching for any UE in any serving cell is performed by a series of processes for deactivating the currently active DL BWP part and activating the new DL BWP. Similarly, the uplink BWP switching for any UE in any serving cell is performed by a series of processes for deactivating the currently active uplink BWP and activating the new uplink BWP.

As described above, a NR CC may be configured with one or more BWPs. In terms of configuring the BWPs in a NR CC, the corresponding BWPs may be configured based on a UE-specific or cell-specific configuration. In other words, the BWPs may be configured differently according to the UEs as shown in FIG. 3, or the BWPs may be configured equally for all the UEs with respect to a NR CC. However, FIG. 3 merely shows an example, and the embodiments of the present disclosure are not limited to the specific bandwidth of the NR CC and the bandwidth for each BWP embodiment.

When the BWPs are configured for a NR CC, UL/DL BWPs for communication between the UE and the BS may be configured to a time instance by activation of DL BWPs for PDSCH/PUSCH transmission and reception and activation of UL BWPs for PUCCH/PUSCH transmission and reception between the BS and the UE among the configured BWPs.

Specifically, one or more BWPs may be set up for a UE in a NR CC. As an example of configuring the BWP for the certain UE, the BWP may be configured independently of the DL BWP and the UL BWP. Therefore, a UE may perform reception for a DL physical signal and a physical channel through one or more DL BWPs activated by a BS/network among one or more DL BWPs set up for the UE. Likewise, a UE performs transmission for a UL physical signal and a physical channel to the BS through one or more UL BWPs activated by the BS/network among one or more UL BWPs set up for the UE.

The embodiments set forth herein may even be applied to a UE, a BS and a core network entity (or mobility management entity (MME)) which employs all mobile communication technologies. For example, the embodiments may be applied to a next-generation mobile communication (5G mobile communication or New-RAT) UE, a BS and a core network entity (access and mobility function (AMF)) as well as a mobile communication UE employing the LTE technology. For convenience of description, the BS may refer to an eNB of LTE/E-UTRAN, or may refer to a gNB and a BS (i.e., a central unit (CU), a distributed unit (DU), or the CU and the DU may be provided as a logical entity) in the 5G radio network where the CU and the DU are separated.

Further, the numerology described in present disclosure refers to a numerical characteristic and a numerical value about data transmission/reception and may be determined by a value of subcarrier spacing (hereinafter, referred to as 'SCS'). Therefore, the numerology being different may indicate that the SCS of determining the numerology is different.

In addition, a slot length in the present disclosure may be represented by the number of OFDM symbols forming a slot or by a time occupied by the slot. For example, when the numerology based on the SCS of 15 kHz is used, the length of one slot may be represented by 14 OFDM symbols or by 1 ms.

Further, in the present disclosure, the data channel may include a DL data channel for transmission from the BS to the UE (i.e., PDSCH) or a UL data channel for transmission from the UE to the BS (i.e., PUSCH), and transceiving for the data channel between the UE and the BS may refer to reception for the DL data channel from the BS to the UE or transmission for the UL data channel from UE to the BS.

Hereinafter, various embodiments of a specific BWP activation method for supporting BWB-based PDSCH/PUSCH scheduling in a NR CC and a method of configuring scheduling control information based on the specific BWP activation method will be described in more detail. The embodiments set forth herein may be applied individually or in a combination thereof.

BWP Activation

With regard to a DL BWP set up for a UE, a BS/network may be defined to support the BWP activation commonly applied to all DL physical signals and physical channels. That is, a UE may be expected to receive the DL physical channel such as a PDCCH, a PDSCH, etc. and the DL physical signal such as a CSI-RS, a DM RS, etc. with regard to all the DL BWPs activated by the BS/network. Such an activated BWP may be also referred to as an active BWP.

In this case, the UE may be defined to perform monitoring on at least one control resource set (CORESET) which is configured for the PDCCH reception according to the DL BWPs activated by the BS/network.

In addition, it may be defined to activate the DL BWP through MAC CE signaling or L1 control signaling. Further, it may be defined to activate the DL BWP through UE-specific/cell-specific higher layer signaling.

As another method, the DL BWP for a UE may be defined to be activated by separately setting up and activating one or more DL BWPs for PDCCH reception including scheduling DL control information (DCI) and one or more DL BWPs for PDSCH reception by the BS/network. That is, the activation of the BWP for receiving the PDSCH may be defined to be performed separately from the activation of the DL BWP for the PDCCH among sets of DL BWPs set up for a UE.

According to one embodiment, among BWPs for the UE, one or more BWPs including the CORESET to be monitored for the PDCCH reception in a UE may be defined to be activated through MAC CE signaling. That is, the DL BWP including at least one CORESET, i.e. to be monitored for the PDCCH reception in a UE, may be activated by the BS/network through MAC CE signaling or L1 control signaling.

Further, separately from the DL BWP for the PDCCH reception, it may be defined to activate, by the BS/network, the DL BWP for transmitting and receiving the PDSCH for a corresponding UE. That is, it may be defined to activate a DL BWP for PDSCH transmission and reception in order to allocate a PDSCH resource through DL assignment DCI which is transmitted through the DL DWP for the PDCCH reception. In this case, the DL BWP for the PDSCH reception may be defined to be activated through i) the same MAC CE signaling or L1 control signal of the DL BWP for PDCCH reception but using different information region therein or ii) additional MAC CE signaling or L1 control signal (for example, DL assignment DCI).

As another method of setting up or activating the BWP for the PDCCH reception and setting up or activating the BWP for the PDSCH reception, it may be defined to set up and activate the BWP for the PDCCH reception through the UE-specific or cell-specific higher layer signaling, and it may be defined to activate the BWP for the PDSCH reception through i) DL assignment DCI, ii) MAC CE signaling, or iii) combination of the MAC CE signaling and the DL assignment DCI.

Specifically, it may be defined to implicitly set up and activate the DL BWP for a UE to receive the PDCCH by setting up the CORESET for the UE through the UE-specific higher layer signaling or cell-specific higher layer signaling.

That is, when the BWP to be monitored for the PDCCH reception in the UE is set up through CORESET setup or when information on a frequency resource and the monitoring cycle is set up, the corresponding UE may implicitly recognize that the BWP is activated at the monitoring cycle according to the setup information. Further, when the BWP for the PDSCH reception is activated, it may be defined to indicate the BWP, in which transmission resources for the PDSCH are explicitly or implicitly assigned through the DL assignment DCI transmitted through the PDCCH and thus activate the DL BWP for the PDSCH reception.

For activating an UL BWP for a UE, a similar concept of activating the DL BWP may be applied. That is, it may be defined to support activation of a common UL BWP which is commonly applied to the PUSCH and the PUCCH. In other words, a UE may be defined to perform PUCCH and PUSCH transmission through all the UL BWP activated by the BS/network. In this case, it may be defined to activate the common UL BWP through MAC CE signaling or L1 control signaling. Further, it may be defined to activate the common UL BWP through UE-specific or cell-specific higher layer signaling.

As another method of activating the UL BWP for a UE, it may be defined that each individual UL BWP for the PUSCH and the PUCCH is activated when the UL BWP for a UE is activated in the BS/network. That is, it may be defined to separately activate i) a BWP for PUCCH transmission and ii) a BWP for PUSCH transmission among sets of the UL BWP set up for a UE.

In this case, like the method of setting up the DL BWP for the PDCCH reception and the DL BWP for the PDSCH reception, it may be defined to separately set up and activate i) the UL BWP to which the PUCCH resource is assigned for uplink control information (UPI) transmission and ii) the UL BWP to which the PUSCH resource is assigned for data transmission when the BWP for a UE is activated in a BS/network. However, when the UCI is piggybacked and transmitted on the PUSCH, it may be defined to transmit the UCI through the UL BWP activated for the PUSCH transmission.

In this case, it may be defined to activate the UL BWP for the PUSCH and the UL BWP for the PUCCH i) through the same MAC CE signaling or L1 control signaling used for the DL BWP (e.g. DL assignment DCI, UL grant, etc.) but different information regions defined therein or ii) through additional MAC CE signaling or L1 control signaling (e.g. DL assignment DCI, UL grant, etc.).

As another method of separately activating the UL BWP for PUSCH transmission and the UL BWP for the PUCCH transmission, it may be defined to activate the UL BWP for the PUCCH transmission through i) UE-specific or cell-specific higher layer signaling, ii) L1 control signaling, or iii) the combination of UE-specific/cell-specific higher layer signaling and L1 control signaling. Further, it may be defined to activate the UL BWP for the PUSCH transmission through the UE-specific/cell-specific higher layer signaling, MAC CE signaling, L1 control signaling, or the combination of the UE-specific/Cell-specific higher layer signaling, MAC CE signaling, and L1 control signaling, separately from the foregoing signaling used for activating the UL BWP for the PUCCH.

Specifically, it may be defined to implicitly setup and activate the UL BWP for the PUCCH transmission i) through PUCCH resource configuration using the UE-specific or cell-specific higher layer signaling for a UE (i.e. The BWP in which PUCCH resources are configured is always activated or activated at a PUCCH transmission cycle or timing), or ii) through PUCCH resource indication using DL assignment DCI, UL grant or the like L1 control signaling (i.e. The BWP for the PUCCH transmission is activated at a time of the PUCCH transmission in a case where the PUCCH resources are assigned through the L1 control signaling).

Further, it may be defined the UL BWP for the PUSCH transmission to implicitly or explicitly include the UL BWP assignment information for transmitting the PUSCH through the UL grant, and it may be defined to activate the UL BWP for the PUSCH transmission through the BWP assignment information included in the UL grant.

However, the UL BWP for PRACH and SRS transmission may be activated separately from the activation of the foregoing common UL BWP for the PUCCH/PUSCH transmission.

Specifically, in a case of activating the UL BWP for the SRS transmission, it may be defined to follow all the UL BWPs activated for the PUCCH transmission or PUSCH transmission for the UE. That is, regardless of the method of activating the PUSCH/PUCCH BWP defined in the NR, it may be defined that the SRS transmission in a UE is possible through all the UL BWPs activated for the PUCCH or PUSCH transmission in the UE.

Specifically, when the SRS transmission resources are periodically or aperiodically configured with regard to all the UL BWPs set up for a UE, and when a BWP is activated for at least PUCCH or PUSCH transmission, it may be defined to transmit the periodically or aperiodically configured or indicated SRS through the activated UL BWP.

Further, it may be defined to transmit the SRS through all the BWPs set up for a UE regardless of activation of the UL BWP for the PUCCH/PUSCH transmission and without separate activation of the UL BWP for the SRS transmission.

Further, it may be defined to activate the BWP for the SRS transmission by the BS/network through MAC CE signaling or L1 control signaling separately from the UL BWP activated for the PUSCH/PUCCH transmission.

Further, it may be defined to setup and activate the UL BWP for the SRS transmission only by the BS/network in addition to the UL BWP activated for the PUSCH/PUCCH transmission. That is, it may be defined to support the SRS transmission through the UL BWP activated for the PUSCH/PUCCH transmission in a UE and to set up or activate an additional UL BWP for the SRS transmission besides the UL BWP activated for the PUCCH/PUSCH transmission of the UE in the BS/network.

Further, it may be defined to setup the UL BWP for each individual UE-specific or cell-specific SRS transmission in the BS/network through UE-specific higher layer signaling or cell-specific higher layer signaling, regardless of setting up or activating the UL BWP for the PUSCH/PUCCH.

In addition, when aperiodic SRS transmission using the PDCCH is triggered in a UE, it may be defined the PDCCH to include indication information on the BWP in which the SRS is aperiodically transmitted.

Further, in a case of activating the UL BWP for PRACH transmission, it may be defined to follow all the UL BWPs activated for the PUCCH, PUSCH or SRS transmission of the UE. That is, regardless of the method of activating the BWP for PUSCH/PUCCH and the method of activating the BWP for SRS transmission, which are defined in the NR, it may be defined that the PRACH transmission is possible in a UE through all the UL BWPs activated for the PUCCH/PUSCH or SRS transmission in the UE.

Further, regardless of activation of the UL BWP for the PUCCH/PUSCH or SRS transmission, it may be defined to perform the PRACH transmission through all the BWPs set up for a UE. Further, the BS/network may be defined to separately set up the UL BWP, in which the UE-specific or cell-specific PRACH transmission is possible, through the UE-specific higher layer signaling or cell-specific higher layer signaling. In addition, when PRACH transmission for a UE is achieved through the PDCCH, the PDCCH may be defined to include indication information on the BWP for the PRACH transmission.

Cross BWP Scheduling and Multi-BWPs Scheduling

A BS/network may be defined to set up single BWP scheduling or multi-BWP scheduling when a plurality of DL BWPs or UL BWPs is configured for each individual UE.

The single BWP scheduling may be defined as a scheduling method of limiting to perform only one PDSCH resource allocation and PUSCH resource allocation within one BWP through single scheduling DCI (e.g. DL assignment DCI, UL grant, etc.). On the other hand, the multi-BWPs scheduling may be defined as a scheduling method of supporting the PDSCH resource allocation and the PUSCH resource allocation using one or more BWPs through single scheduling DCI (e.g. DL assignment DCI, UL grant, etc.).

In addition, when the single BWP scheduling is used, a linkage-based BWP scheduling method and a cross BWP scheduling method may be defined to be configured in a base station/network. Herein, in the linkage-based BWP scheduling method a semi-static linkage is defined between a DL BWP for the same scheduling DCI transmission and a DL or UL BWP for the corresponding PDSCH or PUSCH transmission. Further, the cross BWP scheduling method dynamically supports PDSCH or PUSCH transmission resource allocation using different DL or UL BWPs by the scheduling DCI transmitted through a DL BWP.

The foregoing configurations may be set up through the higher layer signaling or may be performed by the MAC CE signaling or L1 signaling.

Cross BWP Scheduling

When a plurality of DL BWPs is activated for a UE, in particular, when a plurality of DL BWPs is activated for transceiving the PDSCH, there is a need for defining a linkage between the DL BWP for PDSCH transmission of the UE and the DL BWP for PDCCH transmission including scheduling control information for the PDSCH.

The present disclosure proposes a cross BWP scheduling method for performing PDSCH transmission for a UE and PDCCH transmission including scheduling control information on the PDSCH using different BWPs.

To this end, it may be defined to set up a BWP indication field (BIF) value corresponding to each DL BWP through higher layer signaling when the DL BWP is set up for a UE in the BS/network or set up a BIF value corresponding to each DL BWP through activation signaling (e.g. MAC CE signaling or physical layer control signaling) when activation is performed with regard to a DL BWP.

Likewise, with regard to the UL BWP, it may be defined to set up a BIF value corresponding to each UL BWP through higher layer signaling when the UL BWP is set up for a PUSCH or PUCCH transmission according to UL BWPs in the BS/network, or set up a BIF value corresponding to each UL BWP through activation signaling (e.g. MAC CE signaling or L1 control signaling) when activation is performed with regard to a UL BWP.

Therefore, when the cross BWP scheduling is supported, DL assignment DCI or UL grant for the UE is configured to include an information region indicating the foregoing BIF. However, the cross BWP scheduling may be defined to be set up by the BS/network through the higher layer signaling and MAC CE signaling according to the UE. In this case, the DL assignment DCI or UL grant for the UE is configured to include the information region for indicating the foregoing BIF only when the cross BWP scheduling is set up.

On the other hand, when the cross BWP scheduling is not supported, the PDCCH including a DL assignment DCI and the corresponding PDSCH are transmitted through the same DL BWP. Further, in a case of the UL BWP, it may be defined to transmit PUSCH transmission resource allocation information of the UL BWP, i.e., transmit DL BWP indication information on the PDCCH including the UL grant, through higher layer signaling for setting up each individual UL BWP in the BS/network, through MAC CE signaling, or L1 control signaling for activation of the UL BWP.

Alternatively, it may be defined to transmit the UL BWP indication information linked for PUSCH, PUCCH, PRACH, or SRS transmission according to each individual DL BWP through higher layer signaling for setting up each individual DL BWP in the BS/network (or DL BWP for the PDCCH transmission) or through MAC CE signaling or L1 control signaling for activating the DL BWP (or the DL BWP for the PDCCH transmission).

Specifically, linkage indication information on the UL BWP according to each individual DL BWP may refer to UL BWP indication information for PUSCH transmission indicated by UL grant transmitted through each individual DL BWP, and UL BWP indication information for transmission of the UCI, PRACH, or SRS to be triggered through the DL BWP.

Multi-BWPs Scheduling

PDSCH or PUSCH transmission for a UE may be defined to support multi-BWPs scheduling performed through a plurality of DL BWPs or a plurality of BWPs within the same time slice. The multi-BWPs scheduling may be set up by the BS through the UE-specific higher layer signaling or MAC CE signaling or L1 control signaling according to the UE.

Further, it may be defined to implicitly setup the multi-BWPs scheduling when a plurality of DL BWPs (or DL BWPs for transmitting a plurality of PDSCHs) or a plurality of UL BWPs (or UL BWPs for transmitting a plurality of PUSCHs) is set up or activated for a UE.

Therefore, when multi-BWPs scheduling is set up in a UE, DL assignment DCI or UL grant for the UE may be defined to include a bitmap-based indication information region according to DL/UL BWPs set up or activated for transceiving the PDSCH or PUSCH. Bits of configuring a bitmap for indicating the DL or UL BWP may be defined to be one-to-one mapped to one DL BWP or UL BWP to indicate whether PDSCH or PUSCH resources are assigned or not through the DL BWP or the UL BWP.

Thus, it may be defined to commonly apply i) frequency resource (in units of PRB or RBG) assignment information regions and ii) time domain resource allocation information regions of the DL assignment DCI or UL grant to the indicated DL BWP or UL BWP when a DL BWP or UL BWP is indicated by a bitmap information region included in DL assignment DCI or UL grant for a UE.

Further, the multi-BWPs scheduling may be applied in the form of BWP aggregation. That is, with regard to a plurality of DL BWPs or UL BWPs set up for a UE, it may be defined to activate a plurality of DL BWPs or UL BWPs among the plurality of DL BWPs or UL BWPs, and make the BS/network set up BWP aggregation of a plurality of DL BWPs or UL BWPs among the activated DL BWPs or UL BWPs.

In this case, it may be defined to setup the PRB assignment information region included in the DL assignment DCI or UL grant for the UE by the BS and to analyze by the UE on the basis of the PRBs included in all the DL BWPs or UL BWPs to which aggregation is set up.

In this case, one TB assigned by one DCI (in case of single codeword scheduling) or two or more TBs (in case of multiple codewords scheduling) may be transmitted throughout the plurality of DL or UL BWPs in accordance with pieces of PRB assignment information. The BWP aggregation may be configured by the BS/network through the UE-specific higher layer signaling, MAC CE signaling or L1 control signaling.

In addition, when the BWP aggregation for a UE is applied, the foregoing cross BWP scheduling method may be used for scheduling the PDSCH or PUSCH with regard to the aggregated DL BWP or UL BWP.

That is, DL BWP linkage information for the transmission of PDSCH or PUSCH scheduling control information for the aggregated DL BWP or the aggregated UL BWP may be configured in the BS/network, or one BIF value is assigned for the BWP aggregated by the BS/network when the BWP aggregation is configured so that the BIF value can be indicated through the DCI.

Embodiment #1. DL BWP (BandWidth Part) Switching

Figure 4:
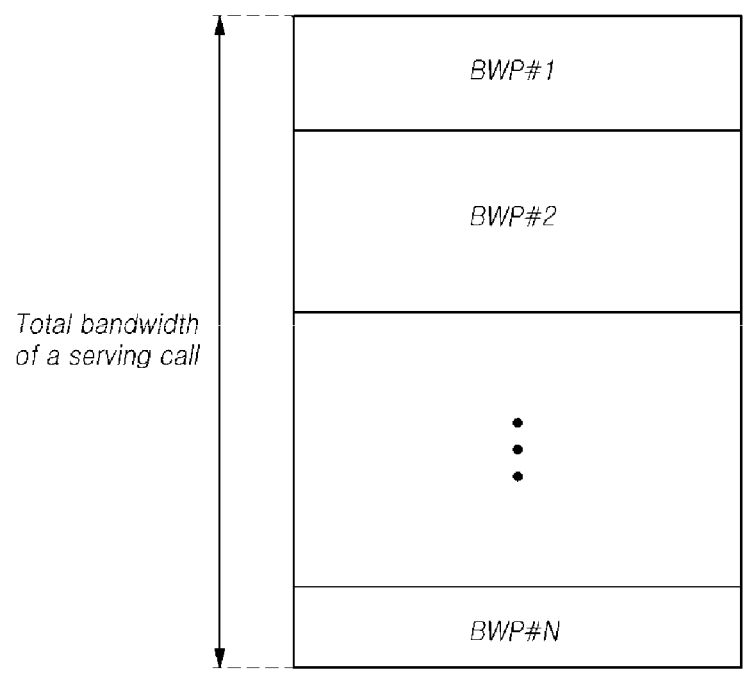
FIG. 4 is a diagram for describing a user equipment (UE)-specific BWP configuration according to an embodiment.

Specifically, N DL BWPs (downlink bandwidth parts) may be configured in any serving cell configured for any UE as shown in FIG. 4. N is an arbitrary natural number, and embodiments of the present disclosure are not limited by the N value. In addition, although FIG. 4 illustrates the respective BWPs which are not overlapped in the frequency axis, a BWP configuration may be made such that they are partially or wholly overlapped in the frequency axis.

When the N DL BWPs are configured in a serving cell for a UE, the DL BWP switching indication information for the corresponding UE may be transmitted through scheduling DCI.

Specifically, the DL BWP switching may be indicated through a DL assignment DCI including resource allocation information for a PDSCH. For this purpose, a DL assignment DCI format configured to be monitored by a UE includes a DL BWP indication field. The DL BWP indication field is referred as a DL BIF, but the embodiment is not limited by its name.

As a method of configuring the DL BIF, the DL BIF may be configured with a bitmap of N bits according to the number of DL BWPs, N, configured for a corresponding UE in a serving cell as shown in FIG. 4 so that the DL BWP activation (or the DL BWP switching) indication information may be transmitted via a bitmap-based indication.

As another method of configuring the DL BIF, the DL BIF may be configured with a BWP index of log 2(N) bits which indicates a activated BWP. The DL BIF be may be configured with a BWP index of log 2(N+1) bits which indicates non-switching BWP (i.e., maintaining the current active BWP) (for example, all of log 2(N+1) bits are 'zero') as well as a newly activated BWP.

The DL BIF may be configured with a BWP index of log 2(N+1) in the case of N=<3 and a BWP index of log 2(N) in case of N=4 according to the number of DL BWPs, N, configured for a corresponding UE in a serving cell.

As another method of configuring the DL BIF, the DL BIF may be defined by the Nmax value which is the maximum number of DL BWPs that may be configured in any serving cell regardless of the number of actual DL BWPs configured for each UE. For example, according to the Nmax value, the DL BIF is configured with a bitmap of Nmax bits so that the DL BWP activation (or the DL BWP switching) indication information may be transmitted through a bitmap-based indication.

As another method of configuring the DL BIF, the DL BIF may be configured with a BWP index of log 2(Nmax) bits which indicates the activated BWP. The DL BIF may be configured with a BWP index of log 2(Nmax+1) bits which indicates non-switching (i.e., maintaining the current active BWP) (for example, all of log 2(Nmax+1) bits are 'zero') as well as a newly activated BWP.

However, whether to include the DL BIF in the DL assignment DCI format to be monitored by a UE is implicitly or explicitly configured by the BS/network As an implicit configuration method, whether to include the DL BIF in the DL assignment DCI format may be determined according to the number of DL BWPs, the N value, configured for a UE in a serving cell. For example, If N=1, the DL assignment DCI format to be monitored by a UE may not include the DL BIF. If N=>2, the DL assignment DCI format may include the DL BIF.

Whether to include the DL BIF in the DL assignment DCI format may be determined according to either the type or the size of the DL assignment DCI format. For example, the DL BIF may be included in the DL assignment DCI format to be monitored by the UE in order to receive the PDSCH scheduling control information only when the DL assignment DCI format is the DCI format 1_1 among the DCI format 1_0 and the DCI format 1_1.

It may be determined whether to include the DL BIF in the DL assignment DCI format according to the type of a search space such as a common search space, a UE-specific search space, a search space consisting of PDCCH candidates above a specific aggregation level and the like.

As an explicit configuration method, whether to include the DL BIF in the DL assignment DCI format may be configured for each UE or each DL assignment DCI format to be monitored by each UE in the BS/network. The information on whether to include the DL BIF may be transmitted through a UE-specific RRC signaling.

Whether to include the DL BIF in the DL assignment DCI format may be configured for each CORESET for a UE or each search space such as a common Search Space, a UE-specific Search Space, a search space consisting of PDCCH candidates above a specific aggregation level and the like. The information on whether to include the DL BIF may be transmitted through a UE-specific RRC signaling.

Whether to include the DL BIF may be configured by the combination of the above-mentioned implicit and the explicit configuration methods.

In case of whether to include the DL BIF in the DL assignment DCI format to be monitored by a UE is implicitly or explicitly configured by the BS/network, the PDSCH resource allocation information through the DL assignment DCI format not including the DL BIF may be interpreted by the UE as the PDSCH resource allocation information within the DL BWP that is the same as the DL BWP to which the corresponding DL assignment DCI is transmitted.

Additionally, DL BWP switching may be supported through the DCI that does not include scheduling control information for the PDSCH. In this case, the corresponding DL BWP switching may be indicated through the DL assignment DCI format including the DL BIF or through the DCI transmission of the same size as the corresponding DCI format by the BS/network.

For example, if a DL assignment DCI format that includes a DL BIF to be monitored at a UE is used only for DL BWP switching without PDSCH scheduling, Among the information fields included in the DL assignment DCI format, all or some of the remaining information fields (for example, MCS field and/or PRB allocation field and the like) except for the DL BIF may be set to specific values, for example "zeros (0s)". This DL assignment DCI may be interpreted as not including the scheduling control information for the PDSCH and indicating only the DL BWP switching by the UE.

Alternatively, in defining the DL assignment DCI format, a separate information field for indicating the use of the DCI may be included in the DL assignment DCI format. An information field for indicating the use of the DCI is an information field for indicating whether PDSCH scheduling is to be performed (for example, a 1-bit indication field for indicating whether to include the scheduling control information for the PDSCH), an information field for indicating whether to switch the DL BWP (for example, a 1-bit indication field for indicating whether to switch the DL BWP). Alternatively, the information field for indicating the use of the DCI may include two pieces of information with either jointly encoded or separately encoded.

For example, it may be an information field for indicating either the DL BWP switching along with PDSCH scheduling or the DL BWP switching without the PDSCH scheduling. Alternatively, it may be an information field for indicating one of three states including PDSCH scheduling without the DL BWP switching in addition to the above two states.

Hereinafter, specific timing related to the DL BWP switching will be described.

As described, when the DL BWP switching is indicated through the DL assignment DCI, it is necessary to define the timing where the currently active DL BWP is deactivated, and the DL BWP indicated through the DL assignment DCI is newly activated. In particular, in the DL BWP switching, it is necessary to minimize the ambiguity of the BWP transition timing between the UE and the BS for PDCCH transmission and reception. In the present disclosure, the following three approaches are proposed for defining the DL BWP switching timing for this purpose.

1. PDCCH Reception Timing Based Approach

When the DL BWP switching for the UE is indicated through the DCI by the above-described methods, the corresponding UE and the BS may derive the DL BWP switching time of the UE based on a slot of transmitting and receiving the PDCCH including the DCI.

That is, when the DL BWP switching is indicated through the DL assignment DCI in a n-th slot #n, the currently active DL BWP is deactivated, and the new DL BWP indicated by the DL assignment DCI may be activated from the slot # (n+k) after the k slot from the slot #n. However, the DL assignment DCI may not include PDSCH scheduling control information as described above.

For example, the k value may be set by the BS/network and transmitted via a UE-specific higher layer signaling (e.g., RRC signaling). Alternatively, the k value may be sent via physical layer control signaling (e.g., the DCI that transmits the corresponding DL BWP switching indication). Alternatively, the k value may have any fixed value, or be determined according to the capability of the UE. When the BWP transition time, each UE may report the corresponding capability for configuring the BWP transition time to the BS/network.

On the contrary, the UE may not receive the PDCCH or the PDSCH through the currently active DL BWP during the reception time of the DCI including the BWP switching indication information and the corresponding BWP transition time. Alternatively, whether or not the PDCCH or the PDSCH is received through the currently active BWP during the BWP transition time may be configured by the BS through the RRC signaling, the MAC CE signaling, physical layer control signaling, or by the capability of the UE. In this case, each UE may report the corresponding capability to the BS/network.

Also, when the BWP transition time is determined according to the capability of the UE, the timing gap (for example, k0 value) between the DCI reception time indicated by information on a time domain resource allocation indicated by the DCI and the PDSCH reception time indicated by the DCI does not guarantee the BWP transition time related capability reported by the UE, the UE may not perform the BWP switching according to the BWP switching indication of the DCI. For example, when the k0 value is smaller than the BWP transition time related capability reported by the UE, the timing gap may not guarantee the BWP transition time related capability reported by the UE.

2. Scheduled PDSCH Reception Timing Based Approach

When the DL BWP switching for the UE is indicated through the DL assignment DCI according to the above-described methods, the corresponding UE and the BS may derive the DL BWP switching time of the UE based on the PDSCH transmission time indicated by the DL assignment DCI or configured through the RRC signaling.

When the DL BWP switching is indicated through the DL BIF included in the DL assignment DCI with the PDSCH scheduling control information for the UE, the corresponding UE and the BS may derive the DL BWP switching time of the UE based on a slot for the PDSCH transmission/reception which is indicated by the DL assignment DCI or configured through the RRC signaling. For example, the above-mentioned slot may be the first slot in which the PDSCH transmission/reception starts among a plurality of slots for PDSCH resource allocation indicated by the corresponding DL assignment DCI.

Specifically, the slot for the PDSCH transmission at the UE receiving the DL assignment DCI at the n-th slot #n may be determined according to either information on a time domain PDSCH resource allocation transmitted through the DL assignment DCI or configuration information on transmission timing relationship between the DL assignment DCI configured through the RRC signaling and the PDSCH. For example, the information on the time domain PDSCH resource allocation may be configuration information on timing gap between transmission/reception of the DL assignment DCI and the PDSCH. When the slot for the PDSCH transmission is the slot # (n+k1), the DL BWP switching may be performed at the slot # (n+k1−k2) before the k2 slot based on the slot # (n+k1) for the PDSCH transmission.

For example, if k2=0, the currently active DL BWP may be deactivated, and the new DL BWP indicated by the DL assignment DCI may be activated from the slot # (n+k1) for the PDSCH transmission.

For example, the k2 value may be set by the BS/network and transmitted via a UE-specific higher layer signaling (e.g., RRC signaling). Alternatively, the k2 value may be sent via physical layer control signaling (e.g., the DCI that transmits the corresponding DL BWP switching indication). Alternatively, the k2 value may have any fixed value, or be determined according to the capability of the UE. When the BWP transition time is determined according to the capability of the UE, each UE may report the corresponding capability for configuring the BWP transition time to the BS/network.

On the contrary, the UE may not receive the PDCCH or the PDSCH through the currently active DL BWP during the reception time of the DCI including the BWP switching indication information and the corresponding BWP transition time. Alternatively, whether to receive the PDCCH or the PDSCH through the currently active BWP during the BWP transition time may be configured by the base station through the RRC signaling, the MAC CE signaling, physical layer control signaling, or by the UE capability. In this case, each UE may report the corresponding capability to the BS/network.

3. HARQ ACK/NACK Feedback Timing of the UE Based Approach

When the DL BWP switching for the UE is indicated through the DL assignment DCI according to the above-described methods, the corresponding UE and the BS may derive the DL BWP switching time of the UE based on HARQ ACK/NACK feedback time of the PDSCH reception indicated by the DL assignment DCI or configured through the RRC signaling. In this case, the HARQ ACK/NACK feedback of the UE may be utilized for confirming the DL BWP switching indication through the DL assignment DCI of the BS.

When the DL BWP switching is indicated through the DL assignment DCI with the PDSCH scheduling control information for the UE, the corresponding UE and the BS may derive the DL BWP switching time of the UE based on a slot for HARQ ACK/NACK feedback of the UE indicated by the DL assignment DCI or configured through the RRC signaling. For example, the above-mentioned slot may be the slot for the last PUCCH transmission when the PUCCH transmission based on the plurality of slots is indicated or configured.

Specifically, the slot for the PDSCH transmission at the UE receiving the DL assignment DCI at the n-th slot #n may be determined according to either information on a time domain PDSCH resource allocation transmitted through the DL assignment DCI or configuration information on transmission timing relationship between the DL assignment DCI configured through the RRC signaling and the PDSCH. For example, the information on the time domain PDSCH resource allocation may be configuration information on timing gap between transmission/reception of the DL assignment DCI and the PDSCH. When the slot for the PDSCH transmission is the slot # (n+k3) and the slot for the HARQ ACK/NACK feedback of the UE is the slot # (n+k4), the DL BWP switching may be performed at the slot # (n+k3+k4+K5) after the k5 slot based on the slot # (n+K3+K4) for the HARQ ACK/NACK feedback of the UE. For example, if k5=1, the currently active DL BWP may be deactivated, and the new DL BWP indicated by the DL assignment DCI may be activated from the next slot after the slot for the HARQ ACK/NACK feedback of the UE.

For example, the k5 value may be set by the BS/network and transmitted via a UE-specific higher layer signaling (e.g., RRC signaling). Alternatively, the k5 value may be sent via physical layer control signaling (e.g., the DCI that transmits the corresponding DL BWP switching indication). Alternatively, the k5 value may have any fixed value or be determined according to the capability of the UE. When the BWP transition time is determined according to the capability of the UE, each UE may report the corresponding capability for configuring the BWP transition time to the BS/network.

On the contrary, the UE may not receive the PDCCH or the PDSCH through the currently active DL BWP during the reception time of the DCI including the BWP switching indication information and the corresponding BWP transition time. Alternatively, whether to receive the PDCCH or the PDSCH through the currently active BWP during the BWP transition time may be configured by the base station through the RRC signaling, the MAC CE signaling, physical layer control signaling, or by the UE capability. In this case, each UE may report the corresponding capability to the BS/network.

If the DL assignment DCI may not include including only the information on the DL BWP switching without the PDSCH scheduling control information, the UE calculates the PUCCH transmission time from the corresponding DCI reception time, performs the HARQ ACK feedback, and determine the slot for the DL BWP switching based on the slot for the HARQ ACK feedback. In applying information on timing gap between the PDSCH reception slot indicated by the DL assignment DCI and the PUCCH/PUSCH transmission slot including the corresponding HARQ ACK/NACK feedback information, it is possible to calculate the PUCCH transmission time by applying the information on the timing gap from the reception time of the DCI including the DL BWP switching information.

Similarly, when the UE receives the DL DCI including only the BWP activation/deactivation indication information i.e., the active BWP switching indication information except for the scheduling control information, the UE may perform HARQ ACK feedback according to the HARQ ACK/NACK feedback timing and perform BWP switching according to the scheduled PDSCH reception timing based approach as described above.

In addition, any DL assignment DCI and its corresponding PDSCH transmission may be constrained to occur at the same DL BWP. That is, the DL BIF information included in the DL assignment DCI is interpreted to indicate the DL BWP switching in the corresponding UE, and the PDSCH resource allocation information included in the DL assignment DCI is interpreted as the PDSCH resource allocation in the DL BWP within which the DL assignment DCI is transmitted.

Embodiment #2. UL BWP (BandWidth Part) Switching

Similar to the above-mentioned UL BWPs (BandWidth Part) switching according to the embodiment 1 in FIG. 4, M UL BWPs (downlink bandwidth parts) may be configured in any serving cell configured for any UE as. M is an arbitrary natural number, and embodiments of the present disclosure are not limited by the M value. In addition, although FIG. 4 illustrates the respective BWPs which are not overlapped in the frequency axis, a BWP configuration may be made such that they are partially or wholly overlapped in the frequency axis.

When the M UL BWPs are configured in a serving cell for a UE, the UL BWP switching indication information for the corresponding UE may be transmitted through scheduling DCI.

Specifically, UL BWP switching may be indicated through a UL grant DCI including resource allocation information for a PUSCH. For this purpose, the UL grant DCI format configured to be monitored by a UE includes a UL BWP indication field for a UL BWP switching. The UL BWP indication field is referred as a UL BIF, but the embodiment is not limited by its name. Additionally, the UL BWP switching may be indicated by the DL assignment DCI including the resource allocation information for the PUSCH. The PUCCH resource allocation information for the HARQ ACK/NACK feedback of the PDSCH may include the UL BIF.

As a method of configuring the UL BIF, the UL BIF may be configured with a bitmap of M bits according to the number of UL BWPs, M, configured for a corresponding UE in a serving cell so that the UL BWP activation (or the UL BWP switching) indication information may be transmitted via a bitmap-based indication.

As another method of configuring the UL BIF, the UL BIF may be configured with a BWP index of log 2(M) bits which indicates an activated BWP. The UL BIF may be configured with a BWP index of log 2(M+1) bits which indicates non-switching (i.e., maintaining the current active BWP) (for example, all of log 2(M+1) bits are 'zero') as well as a newly activated BWP.

The UL BIF may be configured with a BWP index of log 2(M+1) in the case of M=<3 and a BWP index of log 2(M) in case of M=4 according to the number of UL BWPs, M, configured for a corresponding UE in a serving cell, As another method of configuring the UL BIF, the UL BIF may be defined by the M max value which is the maximum number of UL BWPs that may be configured in any serving cell regardless of the number of actual UL BWPs configured for each UE. For example, according to the M max value, the UL BIF is configured with a bitmap of M max bits so that the UL BWP activation (or the UL BWP switching) indication information may be transmitted through a bitmap-based indication.

As another method of configuring the UL BIF, the UL BIF may be configured with a BWP index of log 2(M max) bits which indicates the activated BWP. The UL BIF may be may be configured with a BWP index of log 2(M max+1) bits which indicates non-switching (i.e., maintaining the current active BWP) (for example, all of log 2(M max+1) bits are 'zero') as well as a newly activated BWP.

However, whether to include the UL BIF in the UL grant DCI format to be monitored by a UE is implicitly or explicitly configured by the BS/network As an implicit configuration method, whether to include the UL BIF in the UL grant DCI format may be determined according to the number of UL BWPs, the M value, configured for a UE in a serving cell. For example, If M=1, the UL grant DCI format to be monitored by a UE may not include the UL BIF. If M=>2, the UL grant DCI format may include the UL BIF.

Whether to include the UL BIF in the UL grant DCI format may be determined according to either the type or the size of the UL grant DCI format. For example, the UL BIF may be included in the UL grant DCI format to be monitored by the UE in order to receive the PUSCH scheduling control information only when the UL grant DCI format is the DCI format 0_1 among the DCI format 0_0 and the DCI format 0_1.

Whether to include the UL BIF in the UL grant DCI format may be determined according to the type of a search space such as a common search space, a UE-specific search space, a search space consisting of PDCCH candidates above a specific aggregation level and the like.

As an explicit configuration method, whether to include the UL BIF in the UL grant DCI format may be configured for each UE or each UL grant DCI format to be monitored by each UE in the BS/network. The information on whether to include the UL BIF may be transmitted through a UE-specific RRC signaling.

Whether to include the UL BIF in the UL grant DCI format may be configured for each CORESET for a UE or each search space such as a common search space, a UE-specific search space, a search space consisting of PDCCH candidates above a specific aggregation level and the like. The information on whether to include the UL BIF may be transmitted through a UE-specific RRC signaling.

Whether to include the UL BIF may be configured by the combination of the above-mentioned implicit and the explicit configuration methods.

In case of whether to include the UL BIF in the UL grant DCI format to be monitored by a UE is implicitly or explicitly configured by the BS/network, the PUSCH resource allocation information through the UL grant DCI format not including the UL BIF may be interpreted by the UE as the PUSCH resource allocation information through the active UL BWP at the slot at which the corresponding UL grant DCI is transmitted. The PUSCH resource allocation information through the UL grant DCI format not including the UL BIF may be interpreted by the UE as the PUSCH resource allocation information through the active UL BWP at the slot of transmitting the corresponding PUSCH.

The UL BWP switching may be indicated between a transmission slot for the UL grant DCI and a transmission slot for the PUSCH by the UL grant DCI. In this case, the UE may interpret the PUSCH resource allocation through the UL grant DCI format as the PUSCH resource allocation through the active UL BWP at the slot of transmitting the corresponding UL grant DCI, and then transmit the PUSCH. Also, the UE may interpret the PUSCH resource allocation information in the UL grant DCI as the PUSCH resource allocation within the active UL BWP at the time/slot of transmitting the PUSCH indicated by the UL grant DCI, and then transmit the PUSCH.

Additionally, the UL BWP switching may be supported through the DCI that does not include the scheduling control information for the PUSCH. In this case, the corresponding UL BWP switching may be indicated through the UL grant DCI format including the UL BIF or through the DCI transmission of the same size as the corresponding DCI format by the BS/network.

For example, if a UL grant DCI format that includes a UL BIF to be monitored at a UE is used only for UL BWP switching without the PUSCH scheduling, among the information fields included in the UL grant DCI format, all or some of the remaining information fields (for example, MCS field and/or PRB allocation field and the like) except for the UL BIF may be set to specific values, for example "zeros (0s)". This UL grant DCI may be interpreted as not including the scheduling control information for the PUSCH and indicating only the UL BWP switching by the UE.

Alternatively, in defining the UL grant DCI format, a separate information field for indicating the use of the DCI may be included in the UL grant DCI format. An information field for indicating the use of the DCI is an information field for indicating whether PUSCH scheduling is to be performed (for example, a 1-bit indication field for indicating whether to include the scheduling control information for the PUSCH), an information field for indicating whether to switch the UL BWP (for example, a 1-bit indication field for indicating whether to switch the UL BWP). Alternatively, the information field for indicating the use of the DCI may include two pieces of information with either jointly encoded or separately encoded.

For example, it may be an information field for indicating either the UL BWP switching along with PUSCH scheduling or the UL BWP switching without the PUSCH scheduling. Alternatively, it may be an information field for indicating one of three states including PUSCH scheduling without the UL BWP switching in addition to the above two states.

Hereinafter, a specific timing related to the UL BWP switching will be described.

As described above, when the UL BWP switching is indicated through the UL grant DCI, it is necessary to define the timing where the currently active UL BWP is deactivated, and the UL BWP indicated through the UL grant DCI is newly activated.

1. PDCCH Reception Timing Based Approach

When the UL BWP switching for the UE is indicated through the DCI by the above-described methods, the corresponding UE and the BS may derive the UL BWP switching time of the UE based on a slot of transmitting and receiving the PDCCH including the DCI.

That is, when the UL BWP switching is indicated through the UL grant DCI in a n-th slot #n, the currently active UL BWP is deactivated, and the new UL BWP indicated by the UL grant DCI may be activated from the slot # (n+j) after the j slot from the slot #n. However, the UL grant DCI may not include PUSCH scheduling control information as described above.

For example, the j value may be set by the BS/network and transmitted via a UE-specific higher layer signaling (e.g., RRC signaling). Alternatively, the j value may be sent via physical layer control signaling (e.g., the DCI that transmits the corresponding UL BWP switching indication). Alternatively, the j value may have any fixed value, or be determined according to the capability of the UE. When the BWP transition time is determined according to the capability of the UE, each UE may report the corresponding capability for configuring the BWP transition time to the BS/network.

On the contrary, the UE may not transmit the PUCCH or the PUSCH through the currently active UL BWP during the reception time of the DCI including the BWP switching indication information and the corresponding BWP transition time. Alternatively, whether or not the PUCCH or the PUSCH is transmitted through the currently active BWP during the BWP transition time may be configured by the BS through the RRC signaling, the MAC CE signaling, physical layer control signaling, or by the UE capability. In this case, each UE may report the corresponding capability to the BS/network.

Also, when the BWP transition time is determined according to the capability of the UE, the timing gap (for example, k2 value) between the DCI reception time indicated by information on a time domain resource allocation indicated by the DCI and the PUSCH reception time indicated by the DCI does not guarantee the BWP transition time related capability reported by the UE, the UE may not perform the BWP switching according to the BWP switching indication of the DCI. For example, when the k2 value is smaller than the BWP transition time related capability reported by the UE, the timing gap may not guarantee the BWP transition time related capability reported by the UE.

2. Scheduled PUSCH Reception Timing Based Approach

When the UL BWP switching for the UE is indicated through the UL grant DCI according to the above-described methods, the corresponding UE and the BS may derive the UL BWP switching time of the UE based on the PUSCH transmission time indicated by the UL grant DCI or configured through the RRC signaling.

When the UL BWP switching is indicated through the UL BIF included in the UL grant DCI with the PUSCH scheduling control information for the UE, the corresponding UE and the BS may derive the UL BWP switching time of the UE based on a slot for the PUSCH transmission/reception which is indicated by the UL grant DCI or configured through the RRC signaling. For example, the above-mentioned slot may be the first slot in which the PUSCH transmission/reception starts among a plurality of slots for PUSCH resource allocation indicated by the corresponding UL grant DCI.

Specifically, the slot for the PUSCH transmission at the UE receiving the UL grant DCI at the n-th slot #n may be determined according to either information on a time domain PUSCH resource allocation transmitted through the UL grant DCI or configuration information on transmission timing relationship between the UL grant DCI configured through the RRC signaling and the PUSCH. For example, the information on the time domain PUSCH resource allocation may be configuration information on timing gap between transmission/reception of the UL grant DCI and the PUSCH. When the slot for the PUSCH transmission is the slot # (n+j1), the UL BWP switching may be performed at the slot # (n+j1−j2) before the j slot based on the slot # (n+j1) for the PUSCH transmission.

For example, if j2=0, the currently active UL BWP may be deactivated, and the new UL BWP indicated by the UL grant DCI may be activated from the slot # (n+j1) for the PUSCH transmission. The PUSCH resource allocation information through the UL grant DCI may be interpreted by the UE as the PUSCH resource allocation information through the newly active UL BWP.

On the contrary, the UL BWP switching may be performed at the slot # (n+j1+j2) after the j slot based on the slot # (n+j1) for the PUSCH transmission.

For example, if j1=1, the UL BWP switching may be performed at the next slot after the transmission slot for the PUSCH. The PUSCH resource allocation information through the UL grant DCI may be interpreted based on the previous UL BWP by the UE. For example, the slot #(n+j1) may be the slot for the last PUSCH transmission when the PUSCH transmission based on the plurality of slots is indicated or configured.

For example, the j2 value may be set by the BS/network and transmitted via a UE-specific higher layer signaling (e.g., RRC signaling). Alternatively, the k2 value may be sent via physical layer control signaling (e.g., the DCI that transmits the corresponding UL BWP switching indication). Alternatively, the j2 value may have any fixed value, or be determined according to the capability of the UE. When the BWP transition time is determined according to the capability of the UE, each UE may report the corresponding capability for configuring the BWP transition time to the BS/network.

On the contrary, the UE may not receive the PDCCH or the PUSCH through the currently active UL BWP during the reception time of the DCI including the BWP switching indication information and the corresponding BWP transition time.

Alternatively, whether to receive the PDCCH or the PUSCH through the currently active BWP during the BWP transition time may be configured by the base station through the RRC signaling, the MAC CE signaling, physical layer control signaling, or by the UE capability. In this case, each UE may report the corresponding capability to the BS/network.

In addition, when a 1:1 association is made between the DL BWP and the UL BWP, the DL BWP switching and the UL BWP switching is independently indicated through the DL assignment DCI and the UL grant DCI, and the DL BWP switching time and UL BWP switching time may be applied according to the above-described method, respectively.

However, in this case, the associated DL BWP or the associated UL BWP switchings may be performed by the indications of the UL BWP and DL BWP switchings, respectively. That is, when the DL BWP switching is indicated by the DL assignment DCI, the DL BWP switching time may be defined by the above-described method so that the UL BWP switching associated with the DL BWP as well as the DL BWP switching may be performed. Conversely, when the UL BWP switching is indicated by the UL grant, UL BWP switching time is defined by the above-described method so that the associated DL BWP switching associated with the UL BWP switching as well as the UL BWP switching may be performed.

The above-mentioned BWP transition time may be referred to as another term such as a BWP switching delay, and the embodiment is not limited by its name.

In the first and second embodiments of the present disclosure described above, the UE transmits the capability value of the UE to the BS in order to switch the BWP part used between the UE and the BS, and according to the capability value of the UE a BIF indicating a BWP part to be newly activated is received from the BS and the data channel is transmitted/received through the BWP activated by the BIF.

In the above-described first and second embodiments, the technical idea is described based on two nodes of the UE and the BS. The same technical idea may be applied between the UEs. That is, this technical idea may be applied not only to the communication between the UE and the BS but also to the device to device, the side link communication (Sidelink), the vehicle communication (V2X) and the like. In particular, the present disclosure may be applied to inter-terminal (UE) communication in the next generation radio access technology, and terms such as signal and channel in the present specification may be variously modified and applied according to the type of communication between the UEs.

Accordingly, in order to switch the BWP used between the UE and another UE, the UE according to the present disclosure transmits the capability value of the UE to another UE and indicate the BWP part to be newly activated according to the capability value of the UE. Another UE receives the BIF and transmits and receives data channels to and from the UE through the BWP activated by the BIF.

Figure 5:
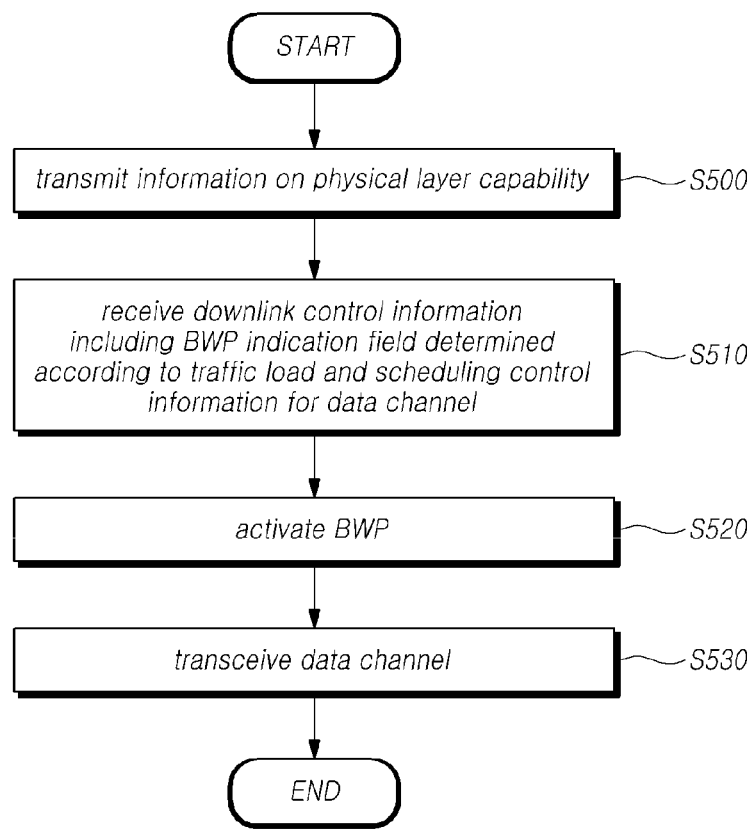
FIG. 5 is a flowchart for showing a method of a UE for switching BWP according to traffic load of the UE according to an embodiment.

FIG. 5 is a flowchart showing a method of a UE for switching a BWP by reflecting traffic load of the UE according to an embodiment.

Referring to FIG. 5, the UE may transmit information on physical layer capability including information on a BWP switching delay type at S500.

The UE may receive BWP configuration information from the BS. The UE may receive the BWP configuration information from the BS through higher layer signaling (for example, RRC signaling). The BWP configuration information refers to information on a BWP set including one or more BWPs configured for the UE.

For example, the BWP configuration information may, for example, include index information for indicating each BWP of the BWP set for the UE.

Further, the BWP configuration information may additionally include information on subcarrier spacing (SCS) and a cyclic prefix (CP) for each BWP of the BWP set.

Each BWP of the BWP set may be configured based on a common RB indexing information on CCs (Component Carriers) configured by the BS. Here, the CC may refer to a NB CC (NarrowBand Component Carrier) or a WB CC (WideBand Component Carrier) and may refer to one or more CCs forming CA (Carrier Aggregation).

Specifically, configuration information of each BWP of the foregoing BWP set may include a starting RB index (i.e., a start point of the BWP) based on the common RB indexing information. Such a starting physical RB index may be represented in units of PRB index based on the common RB indexing. Further, the configuration information of each of the BWPs may additionally include information on the starting RB index based on the common RB indexing information and information on the size of the BWP.

The DL data channel or the UL data channel may be transmitted or received between the UE and the BS through one of the BWPs included in the BWP set configured in the UE according to the received configuration information of each BWP. In this case, the BWP used for transmission or reception of the data channel may be switched to another BWP included in the same BWP set, if necessary.

Among the DL BWPs for the UE, one initial DL BWP may be configured for monitoring the CORESET in the common search space of Type0-PDCCH. Further, among the UL BWPs for the UE, one initial UL BWP may be configured for random access.

For example, when the UE detects an SS block transmitted from the BS, the initial DL BWP and UL BWP may be determined on the basis of the frequency information of the detected SS Block. The initial DL and UL BWPs are activated in an initial access stage. Then, the BWP for receiving a DL data channel from the BS or transmitting a UL data channel to the BS is switching or changeable after the DL and UL BWPs are configured with respect to the UE.

For example, a BWP switching delay is the time taken to convert a BWP used for transmitting and receiving a data channel to another BWP. Such a BWP may be determined on the basis of the capability of the UE. According to the capability of the UE, the UE may be classified into any one of at least two predetermined BWP switching delay types. The UE may transmit physical layer capability information including the BWP switching delay type information determined according to the capability of the UE to the BS for effective switching of the BWP.

When the DL BWP switching for the UE is indicated through the DCI, the UE may derive the DL BWP switching time of the UE based on a slot of receiving the PDCCH including the DCI. For example, the BWP switching delay type may be determined according to the DL BWP switching time of the UE.

For example, when the PDCCH including the DCI is received in a n-th slot #n, it is assumed that the currently active DL BWP is deactivated, and the new DL BWP indicated by the DCI may be activated from the slot # (n+k) after the k slot from the slot #n. For example, the BWP transition time k, which is the time taken to switch the used BWP to another BWP, may be determined according to the capability of the UE.

As described above, when the BWP transition time is determined according to the capability of the UE, the UE may be configured to transmit the capability value of the UE for the BWP transition time to the BS.

As described above, the capability value of the UE may be transmitted to the BS in order to switch the BWP used for wireless communication between the UE and the BS, but the embodiments are is not limited thereto. For example, the UE may transmit a capability value of the UE to another UE in order to switch the BWP used for wireless communication with another UE.

Referring to FIG. 5 again, the UE may receive the DCI including a BWP indication field, which are determined by reflecting a traffic load of the UE, and scheduling control information for the data channel, at S510.

The UE may receive the DL data channel from the BS or transmit the UL data channel to the BS through one BWP indicated by the DCI received from the BS. For example, the BWP indicated by the BWP indication field (BIF) may be configured to one at a specific time. For example, the number of DL BWPs and the number of UL BWPs that may be used by the UE may be configured up to N (N is a natural number equal to or greater than 1), respectively. For example, the number of the DL BWPs and the number of the UL BWPs may be configured differently.

Among the BWPs included in the BWP set configured for the UE, the BIF indicating the BWP to be used for transmission/reception of the data channel may be transmitted through the DL assignment DCI.

For example, the DL BWP switching may be indicated through the DL assignment DCI including the resource allocation information for the PDSCH. In this case, the DL assignment DCI format configured for monitoring at the UE may include the DL BWP indication field (DL BIF) for the DL BWP switching.

Whether to include the DL BIF in the DL assignment DCI format may be determined according to the type of the DL assignment DCI format. For example, the DL BIF may be included in the DL assignment DCI format to be monitored by the UE in order to receive the PDSCH scheduling control information only when the DL assignment DCI format is the DCI format 1_1 among the DCI format 1_0 and the DCI format 1_1. FIG. 9 illustrates the DCI format 1_1 including the DL BIF and the PDSCH scheduling control information which the UE receives.

For example, the UL BWP switching may be indicated through the UL grant DCI including the resource allocation information for the PUSCH. In this case, the UL grant DCI format configured for monitoring at the UE may include the UL BWP indication field (UL BIF) for the UL BWP switching.

Whether to include the UL BIF in the UL grant DCI format may be determined according to either the type or the size of the UL grant DCI format. For example, the UL BIF may be included in the UL grant DCI format to be monitored by the UE in order to receive the PUSCH scheduling control information only when the UL grant DCI format is the DCI format 0_1 among the DCI format 0_0 and the DCI format 0_1. FIG. 10 illustrates the DCI format 0_1 including the UL BIF and the PUSCH grant information which the UE receives.

FIGS. 9 and 10 illustrate a DCI format including PDSCH scheduling control information and the PUSCH grant information, but embodiments of the present disclosure are not limited thereto.

For example, the DL BWP switching may be supported through the DCI that does not include the scheduling control information for the PDSCH. For example, if the DL assignment DCI format is used only for DL BWP switching without the PDSCH scheduling, among the information fields included in the DL assignment DCI format, all or some of the remaining information fields (for example, MCS field and/or PRB allocation field and the like) except for the DL BIF may be set to specific values, for example "zero".

Additionally, the UL BWP switching may be supported through the DCI that does not include the scheduling control information for the PUSCH. For example, if a UL grant DCI format is used only for UL BWP switching without the PUSCH scheduling, among the information fields included in the UL grant DCI format, all or some of the remaining information fields (for example, MCS field and/or PRB allocation field and the like) except for the UL BIF may be set to specific values, for example "zero".

For example, the BIF may be determined according to the number of the BWPs, the N value, included in the BWP set configured for the UE in the serving cell as shown in FIG. 4. The BIF may be configured with a BWP index of log 2(N) bits which indicates an activated BWP. If N=4, the log 2(4) bits=2 and the BWP index of the BIF is one of "00", "01", "10", and "11".

The BIF be may be configured with a BWP index of log 2(N+1) bits which indicates non-switching (i.e., maintaining the current active BWP) (for example, all of log 2(N+1) bits are 'zero') as well as a newly activated BWP.

If N=<3, the BIF be may be configured with may be configured with the BWP index of log 2(N+1) bits. If N=4, the BIF be may be configured with may be configured with the BWP index of log 2(N) bits. For example, if N=1, N=2, N=3 and N=4, the BIF is configured with may be configured with the BWP index of 1 bit, 2 bits, 2 bits and 2 bits, respectively.

According to the one embodiment, the BWP indicated by the value/index of BIF may be determined by reflecting a traffic load of the UE. If the power consumption for the inactive BWP is less than the power consumption for the active BWP between the UE and the BS, the UE may receive the DCI indicating the BWP switching to another BWP from the BS.

For example, the traffic load of the UE at the transmission and the reception of the data channel may be determined based on the state of the UE, the state of the DL and the UL data channel, and the like. As shown in FIG. 4, the UE and the BS may switch the suitable BWP according to the traffic load of the UE at a time. The BWP with the lowest power consumption at that time may be selectively used, thereby reducing the power consumption due to the unnecessary bandwidth-based bandwidth maintenance.

For example, when an amount of the power consumption according to a currently used BWP is greater than a predetermined reference value, the UE or the BS may confirm the power consumption according to another BWP. If it is determined that the power consumption according to another BWP is smaller than the power consumption according to a currently used BWP, information indicating the BWP may be included in the DCI. However, this is an example, and the embodiments of the present disclosure are not limited to the above-mentioned method as long as it can determine the power consumption per BWP.

In the above-mentioned, the UE receives the BIF indicating the BWP to be newly activated from the BS for switching the BWP, but the embodiments of the present disclosure are is not limited to thereto. For example, the UE may receive a BIF indicating the BWP to be newly activated from another UE that has transmitted the capacity value of the UE.

Referring to FIG. 5, again, the UE may activate the BWP indicated by the value of the BWP indication field in consideration of a transition time determined by the information on the BWP switching delay type at S520 and transceive the data channel according to the scheduling control information at S530.

Figure 11:
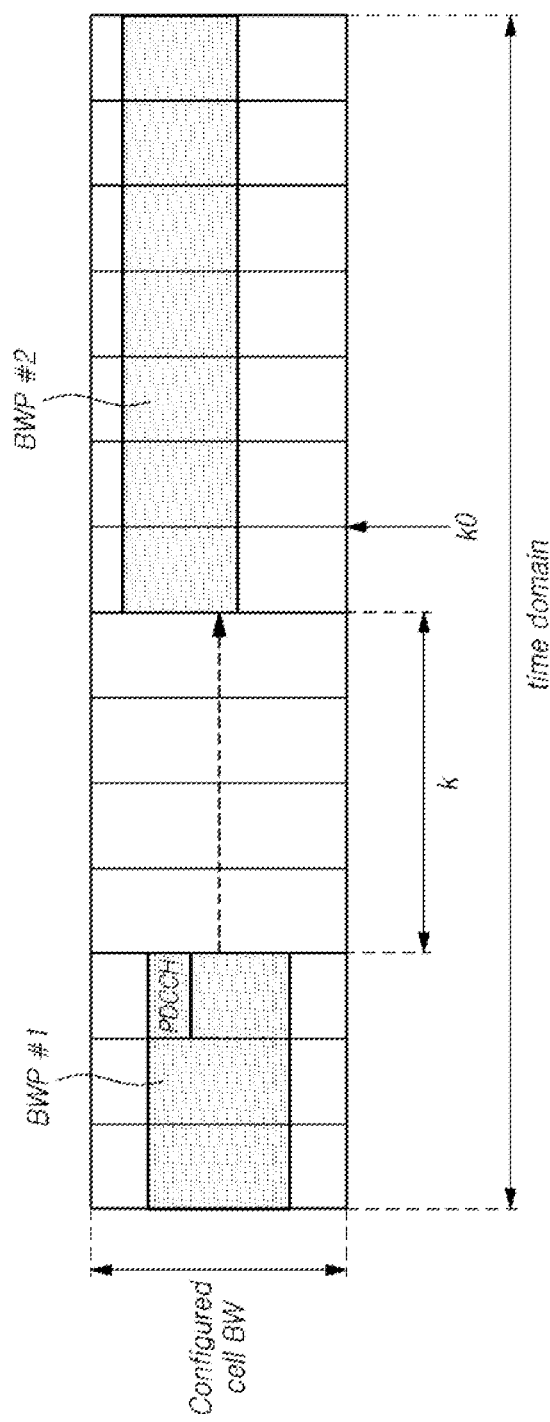
FIGS. 11 to 14 are diagrams for describing switching BWP according to an embodiment.

When the DL BWP switching for the UE is indicated through the DCI, the UE may derive the DL BWP switching time of the UE based on a slot of receiving the PDCCH including the DCI. Referring to FIG. 11, the UE deactivates the currently active DL BWP and activates the new DL BWP indicated by the DCI after the k slot from the slot of receiving the PDCCH including the DCI. For example, the BWP switching time, i.e., the BWP transition time k, may be determined according to the capability of the UE.

The UE may not receive the PDCCH or the PDSCH through the currently active DL BWP during the reception time of the DCI including the BWP switching indication information and the corresponding BWP transition time. Alternatively, whether to receive the PDCCH or the PDSCH through the currently active BWP during the BWP transition time may be configured by the BS through the RRC signaling, the MAC CE signaling, physical layer control signaling, or by the UE capability.

Figure 12:
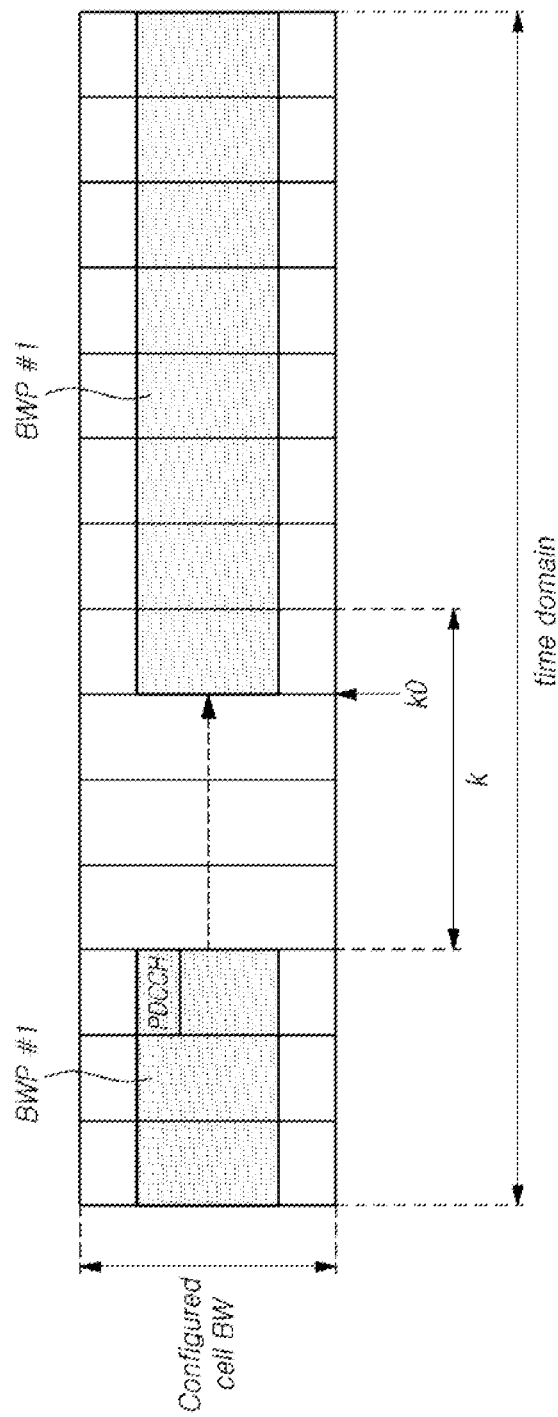

Also, when the BWP transition time is determined according to the capability of the UE, the timing gap (for example, k0 value) between the DCI reception time indicated by information on a time domain resource allocation indicated by the DCI and the PDSCH reception time indicated by the DCI does not guarantee the BWP transition time related capability reported by the UE, the UE may not perform the BWP switching according to the BWP switching indication of the DCI. As shown in FIG. 12, the UE may keep the previous BWP and transceive the data channel from a point in time when a k0 slot defined by the scheduling control information has elapsed.

According to another embodiment, the information on the time domain PDSCH resource allocation may be configuration information on timing gap between transmission/reception of the DL assignment DCI and the PDSCH. When the slot for the PDSCH transmission is the slot # (n+k1), the DL BWP switching may be performed at the slot # (n+k1−k2) before the k2 slot based on the slot # (n+k1) for the PDSCH transmission. For example, if k2=0, the currently active DL BWP may be deactivated, and the new DL BWP indicated by the DL assignment DCI may be activated from the slot for the PDSCH transmission.

When the k2 value is determined according to the capability of the UE, each UE may report the corresponding capability for configuring the BWP transition time to the BS.

When the UL BWP switching is indicated through the UL grant DCI including the PUSCH scheduling control information, the UE may derive the UL BWP switching time for the UE based on the slot of receiving the PDCCH including the DCI. The currently active UL BWP is deactivated, and the new UL BWP indicated by the UL grant DCI may be activated after the j slot from the slot of receiving the PDCCH including the DCI. The j value may be determined according to the capability of the UE.

The UE may not transmit the PUCCH or the PUSCH through the currently active UL BWP during the reception time of the DCI including the BWP switching indication information and the corresponding BWP transition time. Alternatively, whether to transmit the PUCCH or the PUSCH through the currently active BWP during the BWP transition time may be configured by the BS through the RRC signaling, the MAC CE signaling, physical layer control signaling, or by the UE capability.

Also, when the BWP transition time is determined according to the capability of the UE, the timing gap (for example, k2 value) between the DCI reception time indicated by information on a time domain resource allocation indicated by the DCI and the PUSCH reception time indicated by the DCI does not guarantee the BWP transition time related capability reported by the UE, the UE may not perform the BWP switching according to the BWP switching indication of the DCI.

According to another embodiment, the slot for the PUSCH transmission at the UE receiving the UL grant DCI at the n-th slot #n may be determined according to either information on a time domain PUSCH resource allocation transmitted through the UL grant DCI or configuration information on transmission timing relationship between the UL grant DCI configured through the RRC signaling and the PUSCH. For example, the information on the time domain PUSCH resource allocation may be configuration information on timing gap between transmission/reception of the UL grant DCI and the PUSCH. When the slot for the PUSCH transmission is the slot # (n+j1), the UL BWP switching may be performed at the slot # (n+j1−j2) before the j slot based on the slot # (n+j1) for the PUSCH transmission.

For example, if j2=0, the currently active UL BWP may be deactivated, and the new UL BWP indicated by the UL grant DCI may be activated from the slot for the PUSCH transmission.

The j2 value may be determined according to the capability of the UE. When the BWP transition time is determined according to the capability of the UE, each UE may report the corresponding capability for configuring the BWP transition time to the BS.

The UE may transmit and receive the data channel through a newly active BWP by the scheduling control information included in the DCI. FIG. 11 illustrates that the BWP is switched at the lapse of the k slots after the BWP transition time according the one embodiment. According to another embodiment, the switching of the BWP may be performed upon transmission and reception of the data channel after the lapse of the k0 slot according to the scheduling control information.

The UE may activate the new BWP indicated by the value of the BWP indication field at the switching time described above, and transceive the data channel to and from the BS. According to this embodiment, the BWP switching to the BWP with low power consumption can be efficiently performed according to the capability of the UE.

In the above-mentioned, the data channel is transmitted and received through the newly activated BWP between the UE and the BS, but the embodiments of the present disclosure are not limited thereto. As an example, the UE may transmit and receive a data channel through a newly activated BWP to another UE.

Figure 6:
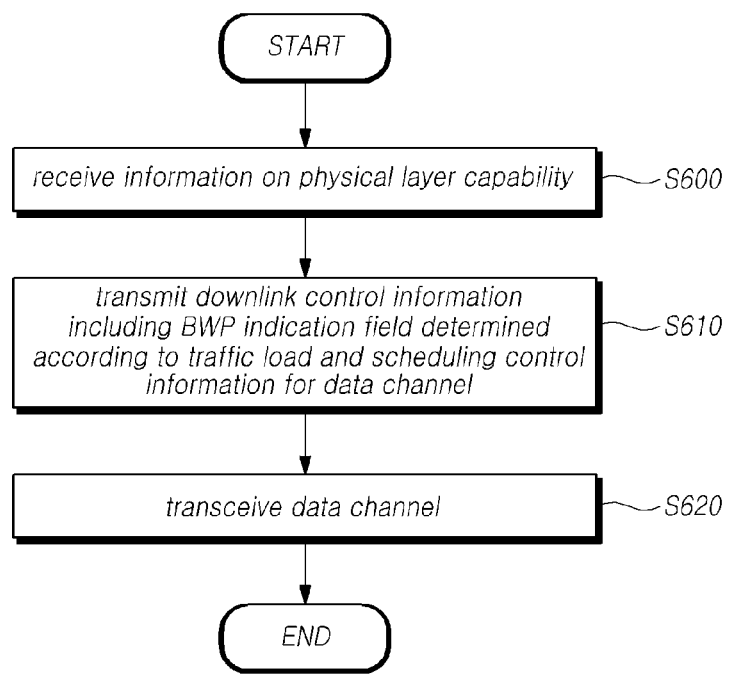
FIG. 6 is a flowchart showing a method of a base station (BS) for switching BWP according to traffic load of the UE according to an embodiment.

FIG. 6 is a flowchart showing a method of a BS for switching a BWP according to an embodiment.

Referring to FIG. 6, the BS may receive information on physical layer capability including information on BWP switching delay type from the UE at S600.

The BS may transmit BWP configuration information to the UE. The BS may transmit the BWP configuration information to the UE through higher layer signaling (for example, RRC signaling). The BWP configuration information refers to information on a BWP set including one or more BWPs configured for the UE.

The BWP configuration information may, for example, include index information for indicating each BWP of the BWP set for the UE.

For example, a BWP switching delay denotes the time taken to convert a BWP used for transmitting and receiving a data channel to another BWP. The BWP switching delay may be determined on the basis of the capability of the UE. According to the capability of the UE, the UE may be classified into any one of at least two predetermined BWP switching delay types. The BS may receive physical layer capability information including the BWP switching delay type information determined according to the capability of the UE from the UE for effective switching of the BWP.

When the DL BWP switching for the UE is indicated through the DCI, the UE may derive the DL BWP switching time of the UE based on a slot of receiving the PDCCH including the DCI. For example, the BWP switching delay type may be determined according to the DL BWP switching time of the UE.

For example, when the PDCCH including the DCI is received in a n-th slot #n, it is assumed that the currently active DL BWP is deactivated and the new DL BWP indicated by the DCI may be activated from the slot # (n+k) after the k slot from the slot #n. For example, the BWP transition time k, which is the time taken to switch the used BWP to another BWP, may be determined according to the capability of the UE.

As described, when the BWP transition time is determined according to the capability of the UE, the BS may receive the capability value of the UE for configuring the BWP transition time from the UE.

When the BS switches the BWP used for wireless communication with the UE, it may control the scheduling of the data channel by reflecting the received capability value of the UE.

Referring to FIG. 6 again, the BS may transmit the DCI including the BWP indication field determined according to a traffic load of the UE and scheduling control information for the data channel at S610.

The BS may determine the BWP indication field indicating one BWP different from the active BWP among the one or more BWPs included in the BWP set configured for the UE, by reflecting the traffic load of the UE.

For example, the BIF may be determined according to the number of the BWPs, the N value, included in the BWP set configured for the UE in the serving cell as shown in FIG. 4. The BIF may be configured with a BWP index of log 2(N) bits which indicates a activated BWP. If N=4, the log 2(4) bits=2 and the BWP index of the BIF is one of "00", "01", "10", and "11".

The BIF be may be configured with a BWP index of log 2(N+1) bits which indicates non-switching (i.e., maintaining the current active BWP) (for example, all of log 2(N+1) bits are 'zero') as well as a newly activated BWP.

If N=<3, the BIF be may be configured with may be configured with the BWP index of log 2(N+1) bits. If N=4, the BIF be may be configured with may be configured with the BWP index of log 2(N) bits. For example, if N=1, N=2, N=3 and N=4, the BIF is configured with may be configured with the BWP index of 1 bit, 2 bits, 2 bits and 2 bits, respectively.

The BS may transmit the DL data channel to the UE or receive the UL data channel from the UE through one BWP indicated by the DCI. For example, the BWP indicated by the BWP indication field (BIF) may be configured to one at a specific time. For example, the number of DL BWPs and the number of UL BWPs that may be used by the UE may be configured up to N (N is a natural number equal to or greater than 1), respectively.

According to the one embodiment, the BWP indicated by the value/index of BIF may be determined by reflecting a traffic load of the UE. If the power consumption when is due to the inactive BWP is less than the power consumption due to the active BWP used the wireless communication between the UE and the BS, the BS may transmit the DCI indicating the BWP switching to another BWP to the UE.

For example, the traffic load of the UE at the transmission and the reception of the data channel may be determined based on the state of the UE, the state of the DL and the UL data channel, and the like. As shown in FIG. 4, the UE and the BS may switch the suitable BWP according to the traffic load of the UE at a time. The BWP with the lowest power consumption at that time may be selectively used, thereby reducing the power consumption due to the unnecessary bandwidth-based bandwidth maintenance.

For example, when an amount of the power consumption according to a currently used BWP is greater than a predetermined reference value, the UE or the BS may confirm the power consumption according to another BWP. If it is determined that the power consumption according to another BWP is smaller than the power consumption according to a currently used BWP, information indicating the BWP may be included in the DCI.

Among the BWPs included in the BWP set configured for the UE, the BIF indicating the BWP to be used for transmission/reception of the data channel may be transmitted through the DL assignment DCI.

For example, the DL BWP switching may be indicated through the DL assignment DCI including the resource allocation information for the PDSCH. In this case, the DL assignment DCI format configured for monitoring at the UE may include the DL BWP indication field (DL BIF) for the DL BWP switching.

Whether to include the DL BIF in the DL assignment DCI format may be determined according to the type of the DL assignment DCI format. For example, the DL BIF may be included in the DL assignment DCI format to be monitored by the UE in order to receive the PDSCH scheduling control information only when the DL assignment DCI format is the DCI format 1_1 among the DCI format 1_0 and the DCI format 1_1. FIG. 9 illustrates the DCI format 1_1 including the DL BIF and the PDSCH scheduling control information which the BS transmit to the UE.

For example, the UL BWP switching may be indicated through the UL grant DCI including the resource allocation information for the PUSCH. In this case, the UL grant DCI format configured for monitoring at the UE may include the UL BWP indication field (UL BIF) for the UL BWP switching.

Whether to include the UL BIF in the UL grant DCI format may be determined according to either the type or the size of the UL grant DCI format. For example, the UL BIF may be included in the UL grant DCI format to be monitored by the UE in order to receive the PUSCH scheduling control information only when the UL grant DCI format is the DCI format 0_1 among the DCI format 0_0 and the DCI format 0_1. FIG. 10 illustrates the DCI format 0_1 including the UL BIF and the PUSCH grant information which the BS transmit to the UE.

FIGS. 9 and 10 illustrate DCI formats including the PDSCH scheduling control information and the PUSCH grant information, but the embodiments of the present disclosure are not limited thereto.

For example, the DL BWP switching may be supported through the DCI that does not include the scheduling control information for the PDSCH. For example, if the DL assignment DCI format is used only for DL BWP switching without the PDSCH scheduling, among the information fields included in the DL assignment DCI format, all or some of the remaining information fields (for example, MCS field and/or PRB allocation field and the like) except for the DL BIF may be set to specific values, for example "zero".

Additionally, the UL BWP switching may be supported through the DCI that does not include the scheduling control information for the PUSCH. For example, if a UL grant DCI format is used only for UL BWP switching without the PUSCH scheduling, among the information fields included in the UL grant DCI format, all or some of the remaining information fields (for example, MCS field and/or PRB allocation field and the like) except for the UL BIF may be set to specific values, for example "zero".

Referring to FIG. 6 again, when the BWP indicated by the value of the BWP indication field is activated in consideration of a transition time determined by the information on the BWP switching delay type, the BS transceive the data channel according to the scheduling control information at S620.

When the DL BWP switching for the UE is indicated through the DCI, the UE may derive the DL BWP switching time of the UE based on a slot of receiving the PDCCH including the DCI. Referring to FIG. 11, the UE deactivates the currently active DL BWP and activates the new DL BWP indicated by the DCI after the k slot from the slot of receiving the PDCCH including the DCI.

According to another embodiment, the information on the time domain PDSCH resource allocation may be configuration information on timing gap between transmission/reception of the DL assignment DCI and the PDSCH. When the slot for the PDSCH transmission is the slot # (n+k1), the DL BWP switching may be performed at the slot # (n+k1−k2) before the k2 slot based on the slot # (n+k1) for the PDSCH transmission. For example, if k2=0, the currently active DL BWP may be deactivated, and the new DL BWP indicated by the DL assignment DCI may be activated from the slot for the PDSCH transmission.

When the k2 value is determined according to the capability of the UE, the BS may receive the corresponding capability for configuring the BWP transition time from the UE.

When the BS indicates the UL BWP switching through the UL grant DCI including the PUSCH scheduling control information, the UE may derive the UL BWP switching time for the UE based slot of receiving the PDCCH including the DCI. The currently active UL BWP is deactivated and the new UL BWP indicated by the UL grant DCI may be activated after the j slot from the slot of receiving the PDCCH including the DCI. The j value may be determined according to the capability of the UE.

According to another embodiment, the slot for the PUSCH transmission at the UE receiving the UL grant DCI at the n-th slot #n may be determined according to either information on a time domain PUSCH resource allocation transmitted through the UL grant DCI or configuration information on transmission timing relationship between the UL grant DCI configured through the RRC signaling and the PUSCH. For example, the information on the time domain PUSCH resource allocation may be configuration information on timing gap between transmission/reception of the UL grant DCI and the PUSCH. When the slot for the PUSCH transmission is the slot #(n+j1), the UL BWP switching may be performed at the slot # (n+j1−j2) before the j slot based on the slot # (n+j1) for the PUSCH transmission.

For example, if j2=0, the currently active UL BWP may be deactivated and the new UL BWP indicated by the UL grant DCI may be activated from the slot for the PUSCH transmission.

The j2 value may be determined according to the capability of the UE. When the BWP transition time is determined according to the capability of the UE, the BS may receive the corresponding capability for configuring the BWP transition time from the UE.

When the new BWP indicated by the value of the BWP indication field is activated at the transition time described above, the BS transceives the data channel to and from the BS. According to this embodiment, the BWP switching to the BWP with low power consumption can be efficiently performed according to the capability of the UE.

Each operation by the BS may be performed in another specific UE. In this case, according to one embodiment, the description described with reference to FIG. 6 may be applied substantially equally between one UE and another UE.

Figure 7:
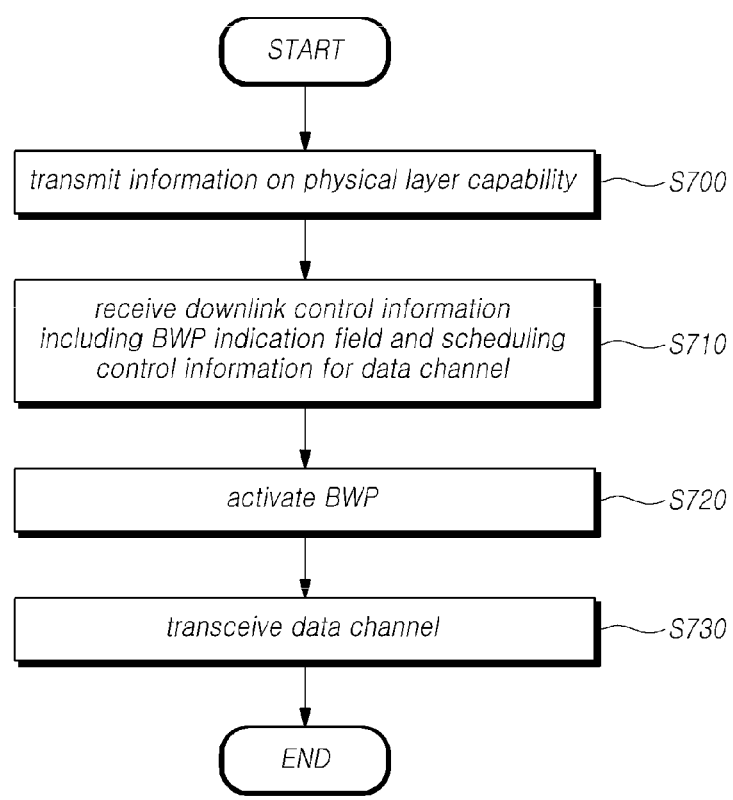
FIG. 7 is a flowchart showing a method of a UE for switching BWP according to an embodiment.

FIG. 7 is a flowchart showing a method of a UE for switching a BWP according to an embodiment.

Referring to FIG. 7, the UE may transmit information on physical layer capability including information on BWP switching delay type at S700.

Since step S700 is substantially the same as step S500 of FIG. 5, detailed description will be omitted in order to avoid redundant description. Hereinafter, the description described with reference to FIG. 5 may be applied substantially equally to one embodiment described with reference to FIG. 7.

As shown in FIG. 5, the UE may transmit the capability value of the UE to the BS in order to switch the BWP used for wireless communication between the UE and the BS. For example, the UE may transmit a capability value of the UE to another UE in order to switch the BWP used for wireless communication with another UE.

Referring to FIG. 7 again, the UE may receive the DCI including a BWP indication field indicating one BWP different from the active BWP among the one or more BWPs included in the BWP set configured for the UE, and scheduling control information for the data channel at S710.

The UE may receive the DL data channel from the BS or transmit the UL data channel to the BS through one BWP indicated by the DCI received from the BS. For example, the number of DL BWPs and the number of UL BWPs that may be used by the UE may be configured up to N (N is a natural number equal to or greater than 1), respectively. For example, the number of the DL BWPs and the number of the UL BWPs may be configured differently.

Among the BWPs included in the BWP set configured for the UE, the BIF indicating the BWP to be used for transmission/reception of the data channel may be transmitted through the DL assignment DCI.

The DL assignment DCI format configured for monitoring at the UE may include the DL BWP indication field (DL BIF) for the DL BWP switching.

Whether to include the DL BIF in the DL assignment DCI format may be determined according to the type of the DL assignment DCI format. For example, the DL BIF may be included in the DL assignment DCI format to be monitored by the UE in order to receive the PDSCH scheduling control information only when the DL assignment DCI format is the DCI format 1_1 among the DCI format 1_0 and the DCI format 1_1. FIG. 9 illustrates the DCI format 1_1 including the DL BIF and the PDSCH scheduling control information.

For example, the UL BWP switching may be indicated through the UL grant DCI including the resource allocation information for the PUSCH. In this case, the UL grant DCI format configured for monitoring at the UE may include the UL BWP indication field (UL BIF) for the UL BWP switching.

Whether to include the UL BIF in the UL grant DCI format may be determined according to either the type or the size of the UL grant DCI format. For example, the UL BIF may be included in the UL grant DCI format to be monitored by the UE in order to receive the PUSCH scheduling control information only when the UL grant DCI format is the DCI format 0_1 among the DCI format 0_0 and the DCI format 0_1. FIG. 10 illustrates the DCI format 0_1 including the UL BIF and the PUSCH grant information.

For example, the BIF may be determined according to the number of the BWPs, the N value, included in the BWP set configured for the UE in the serving cell as shown in FIG. 4. The BIF may be configured with a BWP index of log 2(N) bits which indicates an activated BWP. If N=4, the log 2(4) bits=2 and the BWP index of the BIF is one of "00", "01", "10", and "11".

The BIF be may be configured with a BWP index of log 2(N+1) bits which indicates non-switching (i.e., maintaining the current active BWP) (for example, all of log 2(N+1) bits are 'zero') as well as a newly activated BWP.

If N=<3, the BIF be may be configured with may be configured with the BWP index of log 2(N+1) bits. If N=4, the BIF be may be configured with may be configured with the BWP index of log 2(N) bits. For example, if N=1, N=2, N=3 and N=4, the BIF is configured with may be configured with the BWP index of 1 bit, 2 bits, 2 bits and 2 bits, respectively.

In the above-mentioned, the UE receives the BIF indicating the BWP to be newly activated from the BS for switching the BWP, but the embodiments of the present disclosure are not limited to thereto. For example, the UE may receive a BIF indicating the BWP to be newly activated from another UE that has transmitted the capacity value of the UE.

Referring to FIG. 7, again, the UE may activate the BWP indicated by the value of the BWP indication field in consideration of a transition time determined by the information on the BWP switching delay type at S720 and transmit and receive the data channel according to the scheduling control information at S730.

When the DL BWP switching for the UE is indicated through the DCI, the UE may derive the DL BWP switching time of the UE based on a slot of receiving the PDCCH including the DCI. Referring to FIG. 11, the UE deactivates the currently active DL BWP and activates the new DL BWP indicated by the DCI after the k slot from the slot of receiving the PDCCH including the DCI. For example, the BWP transition time k may be determined according to the capability of the UE.

The UE may not receive the PDCCH or the PDSCH through the currently active DL BWP during the reception time of the DCI including the BWP switching indication information and the corresponding BWP transition time. Alternatively, whether to receive the PDCCH or the PDSCH through the currently active BWP during the BWP transition time may be configured by the BS through the RRC signaling, the MAC CE signaling, physical layer control signaling, or by the capability of the UE.

The UE may transceive the data channel through the newly active BWP according to the scheduling control information included in the DCI. FIG. 11 shows that the BWP is switched immediately after the lapse of the k slot, which is the BWP transition time. For example, the switching of the BWP may be performed upon transmission and reception of the data channel after the lapse of the k0 slot according to the scheduling control information.

For example, when the transmission time of the data channel according to the scheduling control information is before passing the BWP transition time from the reception time of the DCI, the UE may keep activating the currently active BWP.

As shown in FIG. 12, when the BWP transition time is determined according to the capability of the UE, the timing gap (for example, k0 value) between the DCI reception time indicated by information on a time domain resource allocation indicated by the DCI and the PDSCH reception time indicated by the DCI does not guarantee the BWP transition time k related capability reported by the UE, the UE may not perform the BWP switching according to the BWP switching indication of the DCI. The UE may keep the previous BWP and transceive the data channel from a point in time when the k0 slot defined by the scheduling control information has elapsed.

Figure 13:
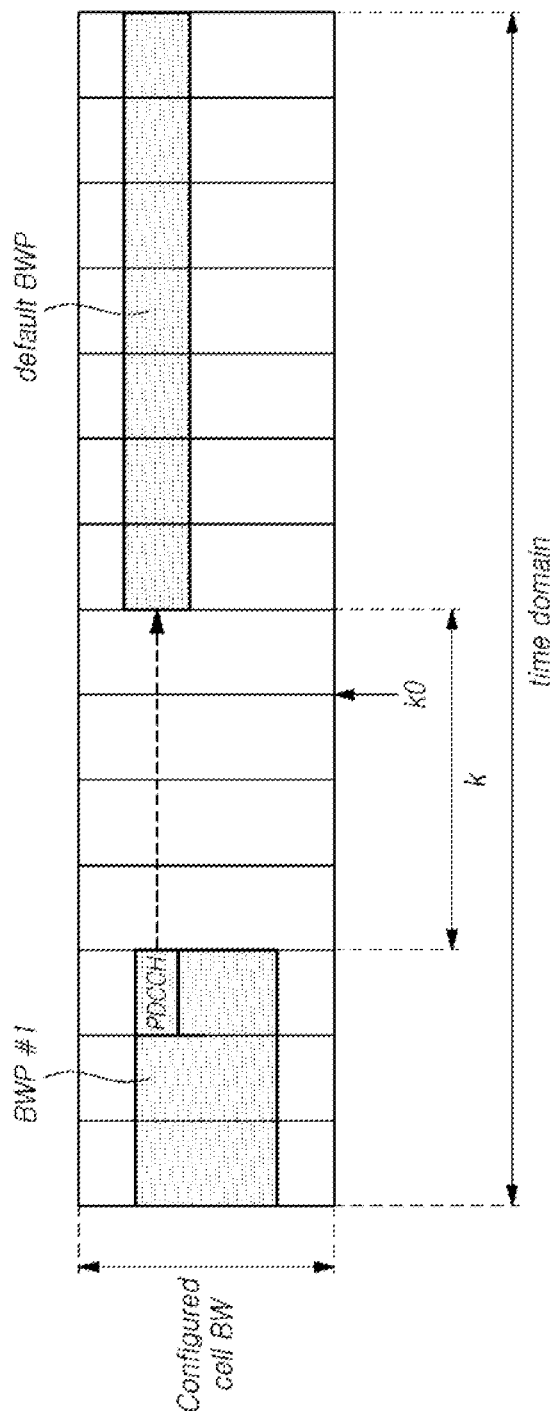

According to one embodiment, when the transmission time of the data channel according to the scheduling control information is before passing the BWP transition time from the reception time of the DCI, the UE may activate a predetermined default BWP. As shown in FIG. 13, when the k0 value, which is the timing gap between the DCI reception time and the data channel reception time by indicated the scheduling control information included in the DCI, is ahead of the BWP transition time k indicated by the UE, the UE may not perform the BWP switching according to the indication of the DCI.

In this case, the UE may activate a predetermined default BWP and transceive the data channel through the predetermined default BWP. The default BWP shown in FIG. 13 is one example, but the embodiments of the present disclosure are not limited to thereto. For example, when the BWP is switched as the default BWP at the lapse of the k slot, the UE may transmit information on being capable of receiving the data channel, or may request a DCI including new scheduling control information for the data channel, to the BS For example, the transition time kd, which is the time to switch the BWP to the default BWP according to the capability of the UE, may be set to be shorter than the normal BWP transition time k. In this case, if the kd is shorter than the k0, the UE may switch the BWP to the default BWP at a time when the kd has elapsed after the PDCCH is received.

Figure 14:
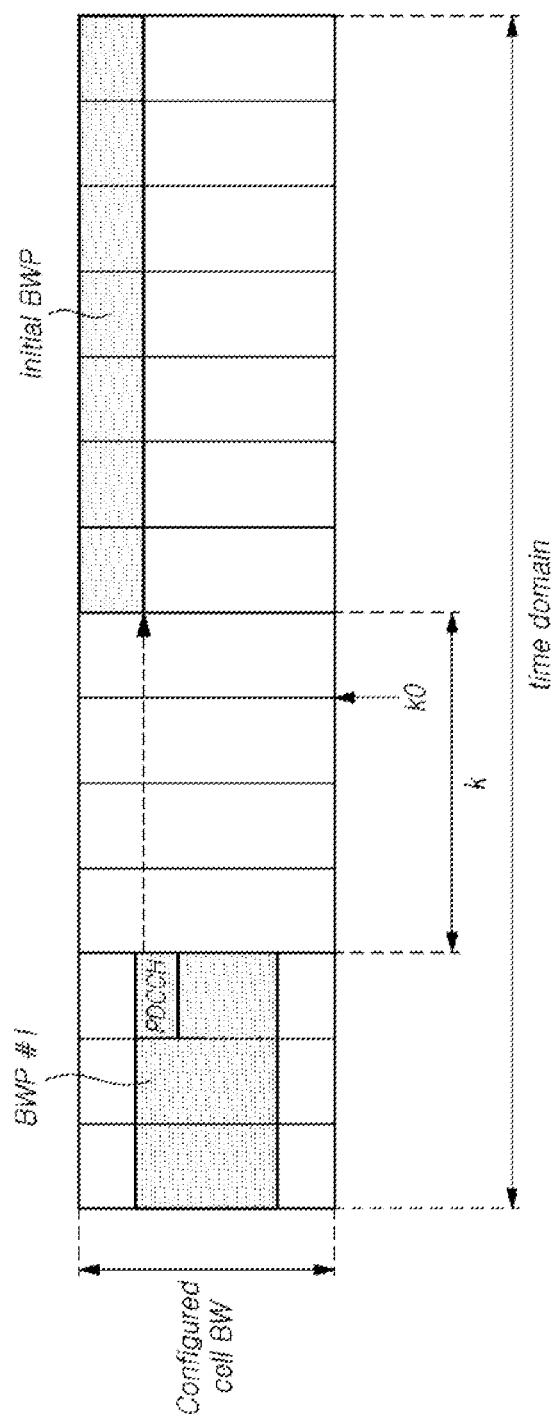

According to one embodiment, when the transmission time of the data channel according to the scheduling control information is before passing the BWP transition time from the reception time of the DCI, the UE may activate an initial BWP configured for the initial random access operation. As shown in FIG. 14, when the k0 value, which is the timing gap between the DCI reception time and the data channel reception time by indicated the scheduling control information included in the DCI, is ahead of the BWP transition time k indicated by the UE, the UE may not perform the BWP switching according to the indication of the DCI.

In this case, the UE may activate a predetermined initial BWP and transceive the data channel through the activated predetermined initial BWP. The initial BWP shown in FIG. 14 is one example, but the embodiments of the present disclosure are not limited to thereto. For example, when the BWP is switched as the initial BWP at the lapse of the k slot, the UE may transmit information on being capable of receiving the data channel, or may request a DCI including new scheduling control information for the data channel, to the BS.

Alternatively, the transition time ki, which is the time to switch the BWP to the initial BWP according to the capability of the UE, may be set to be shorter than the normal BWP transition time k. In this case, if the ki is shorter than the k, the UE may switch the BWP to the initial BWP at a time when the ki has elapsed after the PDCCH is received.

Although FIGS. 11 to 14 illustrate transmission of the DL data channel, the same thing may be applied to transmission of the UL data channel. When the UL BWP switching is indicated through the UL grant DCI including the PUSCH scheduling control information, the UE may derive the UL BWP switching time for the UE based on the slot of receiving the PDCCH including the DCI. The currently active UL BWP is deactivated and the new UL BWP indicated by the UL grant DCI may be activated after the j slot from the slot of receiving the PDCCH including the DCI. The j value may be determined according to the capability of the UE.

The UE may not transmit the PUCCH or the PUSCH through the currently active UL BWP during the reception time of the DCI including the BWP switching indication information and the corresponding BWP transition time. Alternatively, whether to transmit the PUCCH or the PUSCH through the currently active BWP during the BWP transition time may be configured by the BS through the RRC signaling, the MAC CE signaling, physical layer control signaling, or by the UE capability.

Also, when the BWP transition time is determined according to the capability of the UE, the timing gap (for example, k2 value) between the DCI reception time indicated by information on a time domain resource allocation indicated by the DCI and the PUSCH reception time indicated by the DCI does not guarantee the BWP transition time related capability reported by the UE, the UE may not perform the BWP switching according to the BWP switching indication of the DCI.

As shown in FIGS. 12 to 14, the UL data channel may be transmitted through one of the previous active BWP, the newly activated default BWP and the newly activated initial BWP at the same situation as mentioned above.

The UE may activate the new BWP and transceive the data channel to and from the BS. According to this embodiment, the BWP switching to the new BWP may be efficiently performed according to the capability of the UE.

In the above-mentioned, the data channel is transceived through the newly activated BWP between the UE and the BS, but the embodiments of the present disclosure are not limited thereto. For example, the UE may transmit and receive a data channel through a newly activated BWP to another UE.

Figure 8:
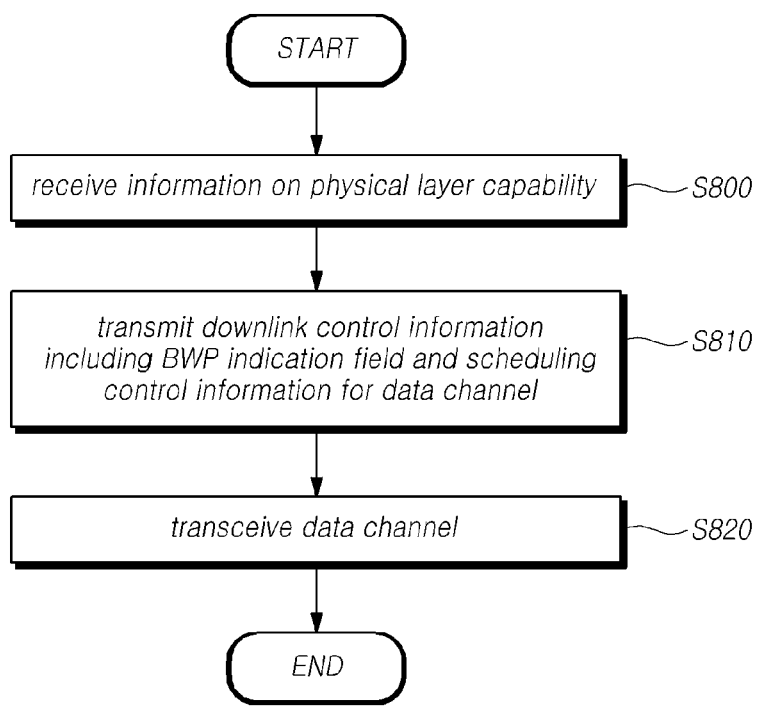
FIG. 8 is a flowchart showing a method of a base station for switching BWP according to an embodiment.

FIG. 8 is a flowchart of a UE for switching a BWP according to an embodiment.

Referring to FIG. 8, the BS may receive information on physical layer capability including information on BWP switching delay type from the UE at S800.

Since step S800 is substantially the same as step S600 of FIG. 6, detailed description will be omitted in order to avoid redundant description. Hereinafter, the description described with reference to FIG. 6 may be applied substantially equally to one embodiment described with reference to FIG. 8.

Referring to FIG. 8 again, the BS may transmit the DCI including the BWP indication field and scheduling control information for the data channel at S810.

The BS may determine a BWP indication field indicating one BWP different from the active BWP among the one or more BWPs included in the BWP set configured for the UE.

For example, the BIF may be determined according to the number of the BWPs, the N value, included in the BWP set configured for the UE in the serving cell as shown in FIG. 4. The BIF may be configured with a BWP index of log 2(N) bits which indicates an activated BWP. If N=4, the log 2(4) bits=2 and the BWP index of the BIF is one of "00", "01", "10", and "11".

The BIF be may be configured with a BWP index of log 2(N+1) bits which indicates non-switching (i.e., maintaining the current active BWP) (for example, all of log 2(N+1) bits are 'zero') as well as a newly activated BWP.

If N=<3, the BIF be may be configured with may be configured with the BWP index of log 2(N+1) bits. If N=4, the BIF be may be configured with may be configured with the BWP index of log 2(N) bits. For example, if N=1, N=2, N=3 and N=4, the BIF is configured with may be configured with the BWP index of 1 bit, 2 bits, 2 bits and 2 bits, respectively.

The BS may transmit the DL data channel to the UE or receive the UL data channel from the UE through one BWP indicated by the DCI received from the BS. For example, the BWP indicated by the BWP indication field (BIF) may be configured to one at a specific time. For example, the number of DL BWPs and the number of UL BWPs that may be used by the UE may be configured up to N (N is a natural number equal to or greater than 1), respectively.

Among the BWPs included in the BWP set configured for the UE, the BIF indicating the BWP to be used for transmission/reception of the data channel may be transmitted through the DL assignment DCI.

For example, the DL BWP switching may be indicated through the DL assignment DCI including the resource allocation information for the PDSCH. In this case, the DL assignment DCI format configured for monitoring at the UE may include the DL BWP indication field (DL BIF) for the DL BWP switching which is transmitted to the UE.

Whether to include the DL BIF in the DL assignment DCI format may be determined according to the type of the DL assignment DCI format. For example, the DL BIF may be included in the DL assignment DCI format to be monitored by the UE in order to receive the PDSCH scheduling control information only when the DL assignment DCI format is the DCI format 1_1 among the DCI format 1_0 and the DCI format 1_1. FIG. 9 illustrates the DCI format 1_1 including the DL BIF and the PDSCH grant information which the BS transmit to the UE.

For example, the UL BWP switching may be indicated through the UL grant DCI including the resource allocation information for the PUSCH. In this case, the UL grant DCI format configured for monitoring at the UE may include the UL BWP indication field (UL BIF) for the UL BWP switching.

Whether to include the UL BIF in the UL grant DCI format may be determined according to either the type or the size of the UL grant DCI format. For example, the UL BIF may be included in the UL grant DCI format to be monitored by the UE in order to receive the PUSCH scheduling control information only when the UL grant DCI format is the DCI format 0_1 among the DCI format 0_0 and the DCI format 0_1. FIG. 10 illustrates the DCI format 0_1 including the UL BIF and the PUSCH grant information.

Referring to FIG. 8, again, when the BWP indicated by the value of the BWP indication field is activated in consideration of a transition time determined by the information on the BWP switching delay type, the BS may transceive the data channel according to the scheduling control information at S820.

When the DL BWP switching for the UE is indicated through the DCI, the UE may derive the DL BWP switching time of the UE based on a slot of receiving the PDCCH including the DCI. Referring to FIG. 11, the UE deactivates the currently active DL BWP and activates the new DL BWP indicated by the DCI after the k slot from the slot of receiving the PDCCH including the DCI.

When the BS indicates the UL BWP switching through the UL grant DCI including the PUSCH scheduling control information, the UE may derive the UL BWP switching time for the UE based on the slot of receiving the PDCCH including the DCI. The currently active UL BWP is deactivated and the new UL BWP indicated by the UL grant DCI may be activated after the j slot from the slot of receiving the PDCCH including the DCI. The j value may be determined according to the capability of the UE.

The BS may transceive the data channel through the newly active BWP according to the scheduling control information included in the DCI. In FIG. 11, it is shown that the BWP is switched immediately after the lapse of the k slot, which is the BWP transition time. For example, the switching of the BWP may be performed upon transmission and reception of the data channel after the lapse of the k0 slot according to the scheduling control information.

For example, when the transmission time of the data channel according to the scheduling control information is before passing the BWP transition time from the reception time of the DCI, the BS may keep activating the currently active BWP.

As shown in FIG. 12, when the BWP transition time is determined according to the capability of the UE, the timing gap (for example, k0 value) between the DCI reception time indicated by information on a time domain resource allocation indicated by the DCI and the PDSCH reception time indicated by the DCI does not guarantee the BWP transition time k related capability reported by the UE, the BS may not perform the BWP switching according to the BWP switching indication of the DCI. The UE may keep the previous BWP and transceive the data channel from a point in time when a k0 slot defined by the scheduling control information has elapsed.

According to one embodiment, when the transmission time of the data channel according to the scheduling control information is before passing the BWP transition time from the reception time of the DCI, the BS may transceive the data channel through the activated predetermined default BWP. As shown in FIG. 13, when the k0 value, which is the timing gap between the DCI reception time and the data channel reception time by indicated the scheduling control information included in the DCI, is ahead of the BWP transition time k indicated by the UE, the UE may not perform the BWP switching according to the indication of the DCI.

In this case, the BS may transceive the data channel through the activated predetermined default BWP. For example, when the BWP is switched as the default BWP at the lapse of the k slot, the BS may receive information on being capable of receiving the data channel, or may receive the request for a DCI including new scheduling control information for the data channel, from the UE.

For example, the transition time kd, which is the time to switch the BWP to the default BWP according to the capability of the UE, may be set to be shorter than the normal BWP transition time k. In this case, if the kd is shorter than the k0, the UE may switch the BWP to the default BWP at a time when the kd has elapsed after the PDCCH is received. In this case, when the k0 lapses, the BS may transceive the data channel through the default BWP.

According to one embodiment, when the transmission time of the data channel according to the scheduling control information is before passing the BWP transition time from the reception time of the DCI, the BS may transceive the data channel through the activated initial BWP. As shown in FIG. 14, when the k0 value, which is the timing gap between the DCI reception time and the data channel reception time by indicated the scheduling control information included in the DCI, is ahead of the BWP transition time k indicated by the UE, the UE may not perform the BWP switching according to the indication of the DCI.

In this case, the BS may transceive the data channel through the activated initial BWP. For example, when the BWP is switched as the initial BWP at the lapse of the k slot, the BS may receive information on being capable of receiving the data channel, or may receive the request for a DCI including new scheduling control information for the data channel, from the UE.

Alternatively, for example, the transition time ki, which is the time to switch the BWP to the initial BWP according to the capability of the UE, may be set to be shorter than the normal BWP transition time k. In this case, if the ki is shorter than the k0, the UE may switch the BWP to the initial BWP at a time when the ki has elapsed after the PDCCH is received. In this case, when the k0 passes, the BS may transceive the data channel through the initial BWP.

Although FIGS. 11 to 14 illustrate transmission of the DL data channel, the same thing may be applied to transmission of the UL data channel. When the UL BWP switching is indicated through the UL grant DCI including the PUSCH scheduling control information, the UE may derive the UL BWP switching time for the UE based on the slot at which the PDCCH including the DCI is received. The currently active UL BWP is deactivated and the new UL BWP indicated by the UL grant DCI may be activated after the j slot from the slot at which the PDCCH including the DCI is received. The j value may be determined according to the capability of the UE.

The UE may not transmit the PUCCH or the PUSCH through the currently active UL BWP during the reception time of the DCI including the BWP switching indication information and the corresponding BWP transition time. Alternatively, whether or not the PUCCH or the PUSCH is transmitted through the currently active BWP during the BWP transition time may be configured by the BS through the RRC signaling, the MAC CE signaling, physical layer control signaling, or by the UE capability.

Also, when the BWP transition time is determined according to the capability of the UE, the timing gap (for example, k2 value) between the DCI reception time indicated by information on a time domain resource allocation indicated by the DCI and the PUSCH reception time indicated by the DCI does not guarantee the BWP transition time related capability reported by the UE, the UE may not perform the BWP switching according to the BWP switching indication of the DCI.

As shown in FIGS. 12 to 14, the UL data channel may be transmitted through one of the previous active BWP, the newly activated default BWP and the newly activated initial BWP at the same situation as mentioned above. The BS may receive the UL data channel through one of them.

When the new BWP indicated by the value of the BWP indication field is activated at the transition time described above, the BS transceives the data channel to and from the BS. According to this embodiment, the BWP switching can be efficiently performed according to the capability of the UE.

Each operation by the BS may be performed in another specific UE. In this case, according to one embodiment, the description described with reference to FIG. 6 may be applied substantially equally between one UE and another UE.

Figure 15:
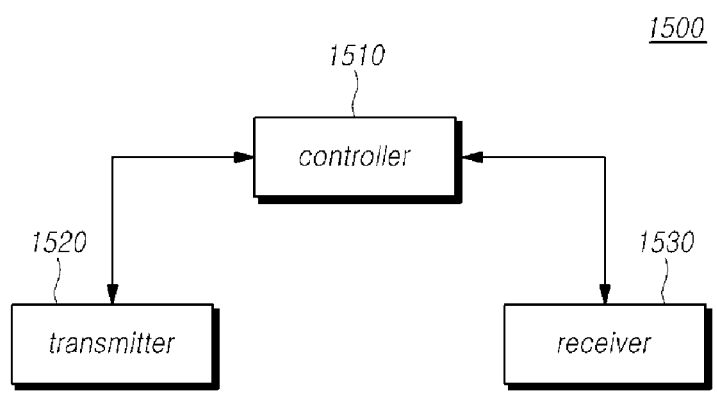
FIG. 15 is a diagram for showing a BS according to embodiments.

FIG. 15 illustrates a BS according to embodiments.

Referring to FIG. 15, a BS 1500 includes a controller 1510, a transmitter 1520, and a receiver 1530.

The transmitter 1520 and the receiver 1530 may transmit and receive a signal, a message or data to and from the UE in order to implement the embodiments of the present disclosure.

The receiver 1530 may receive information on physical layer capability that includes information on a BWP switching delay type. For example, a BWP switching delay (BWP switching delay) is the time taken to convert a BWP used for transmitting and receiving a data channel to another BWP. Such a BWP switching delay may be determined on the basis of the capability of the UE. According to the capability of the UE, the UE may be classified into any one of at least two predetermined BWP switching delay types.

When the DL BWP switching for the UE is indicated through the DCI, the UE may derive the DL BWP switching time of the UE based on a slot at which the PDCCH including the DCI is received. For example, the BWP switching delay type may be determined according to the DL BWP switching time of the UE.

For example, when the PDCCH including the DCI is received in a n-th slot #n, it is assumed that the currently active DL BWP is deactivated and the new DL BWP indicated by the DCI may be activated from the slot # (n+k) after the k slot from the slot #n. For example, the BWP transition time k, which is the time taken to switch the used BWP to another BWP, may be determined according to the capability of the UE.

As described above, when the BWP transition time is determined according to the capability of the UE, the receiver 1530 may receive the capability value of the UE for configuring the BWP transition time from the UE.

When the controller 1510 switches the BWP used for wireless communication with the UE, it may control the scheduling of the data channel by reflecting the received capability value of the UE.

The controller 1510 may configure BWP configuration information on a BWP set including one or more BWPs configured for the UE.

For example, the BWP configuration information may include index information for indicating each BWP of the BWP set for the UE. The BS may transmit the BWP configuration information to the UE through higher layer signaling (for example, RRC signaling).

The controller 1510 may configure BWP configuration information on a BWP set configured with one or more BWPs set up with respect to the UE.

In this case, the BWP configuration information may, for example, include index information for indicating each BWP of the BWP set in terms of the BWP set configured with one or more BWPs set up with regard to the UE. Further, the BS may transmit the BWP configuration information to the UE through higher layer signaling (e.g. RRC signaling).

Specifically, the transmitter 1520 transmits the BWP configuration information to the UE, and transmits DCI, which includes information for indicating one among one or more BWPs included in the BWP set on the basis of the BWP configuration information, to the UE.

For example, the BWP indicated by the BWP indication field (BIF) may be configured to one at a specific time. For example, the number of DL BWPs and the number of UL BWPs used by the UE may be configured up to N (N is a natural number equal to or greater than 1), respectively.

For example, the BIF may be determined according to the number of the BWPs, the N value, included in the BWP set configured for the UE in the serving cell as shown in FIG. 4. The BIF may be configured with a BWP index of log 2(N) bits which indicates an activated BWP. If N=4, the log 2(4) bits=2 and the BWP index of the BIF is one of "00", "01", "10", and "11".

The BIF be may be configured with a BWP index of log 2(N+1) bits which indicates non-switching (i.e., maintaining the current active BWP) (for example, all of log 2(N+1) bits are 'zero') as well as a newly activated BWP.

If N=<3, the BIF be may be configured with may be configured with the BWP index of log 2(N+1) bits. If N=4, the BIF be may be configured with may be configured with the BWP index of log 2(N) bits. For example, if N=1, N=2, N=3 and N=4, the BIF is configured with may be configured with the BWP index of 1 bit, 2 bits, 2 bits and 2 bits, respectively.

According to the one embodiment, the BWP indicated by the value/index of BIF may be determined by reflecting a traffic load of the UE. If it is determined that the power consumption for the inactive BWP is less than the power consumption for the active BWP used the wireless communication between the UE and the BS, the controller 1510 may generate the DCI indicating the BWP switching to another BWP to the UE.

The transmitter 1520 may transmit the DCI including the BWP indication field and scheduling control information for the data channel. When the BWP indicated by the value of the BWP indication field is activated in consideration of a transition time determined by the information on the BWP switching delay type, the transmitter 1520 may transmit the data channel according to the scheduling control information.

The transmitter 1520 may transmit the BIF indicating the BWP to be used for transmission/reception of the data channel among the BWPs included in the BWP set configured for the UE through the DL assignment DCI.

For example, the DL BWP switching may be indicated through the DL assignment DCI including the resource allocation information for the PDSCH. In this case, the DL assignment DCI format configured for monitoring at the UE may include the DL BWP indication field (DL BIF) for the DL BWP switching.

Whether to include the DL BIF in the DL assignment DCI format may be determined according to the type of the DL assignment DCI format. For example, the DL BIF may be included in the DL assignment DCI format to be monitored by the UE in order to receive the PDSCH scheduling control information only when the DL assignment DCI format is the DCI format 1_1 among the DCI format 1_0 and the DCI format 1_1. Referring to FIG. 9, the transmitter 1520 may transmit the DCI format 1_1 including the DL BIF and the PDSCH scheduling control information to the UE.

For example, the UL BWP switching may be indicated through the UL grant DCI including the resource allocation information for the PUSCH. In this case, the UL grant DCI format configured for monitoring at the UE may include the UL BWP indication field (UL BIF) for the UL BWP switching.

Whether to include the UL BIF in the UL grant DCI format may be determined according to either the type or the size of the UL grant DCI format. For example, the UL BIF may be included in the UL grant DCI format to be monitored by the UE in order to receive the PUSCH scheduling control information only when the UL grant DCI format is the DCI format 0_1 among the DCI format 0_0 and the DCI format 0_1. Referring to FIG. 10, the transmitter 1520 may the DCI format 0_1 including the UL BIF and the PUSCH grant information to the UE.

When the BWP indicated by the value of the BWP indication field is activated in the UE, the controller 1510 may control the transmitter 1520 and the receiver 1530 in order to transceive the data channel.

When the DL BWP switching for the UE is indicated through the DCI, the UE may derive the DL BWP switching time of the UE based on a slot at which the PDCCH including the DCI is received. Referring to FIG. 11, the UE deactivates the currently active DL BWP and activates the new DL BWP indicated by the DCI after the k slot from the slot at which the PDCCH including the DCI is received. The BWP transition time k may be determined according to the capability of the UE.

According to another embodiment, the information on the time domain PDSCH resource allocation may be configuration information on timing gap between transmission/reception of the DL assignment DCI and the PDSCH. When the slot for the PDSCH transmission is the slot # (n+k1), the DL BWP switching may be performed at the slot # (n+k1−k2) before the k2 slot based on the slot # (n+k1) for the PDSCH transmission. For example, if k2=0, the currently active DL BWP may be deactivated, and the new DL BWP indicated by the DL assignment DCI may be activated from the slot for the PDSCH transmission.

When the k2 value is determined according to the capability of the UE, the receiver 1530 may receive the corresponding capability for configuring the BWP transition time from the UE.

When the transmitter 1520 indicates the UL BWP switching through the UL grant DCI including the PUSCH scheduling control information, the UE may derive the UL BWP switching time for the UE based on the slot of receiving the PDCCH including the DCI. The currently active UL BWP is deactivated, and the new UL BWP indicated by the UL grant DCI may be activated after the j slot from the slot of receiving the PDCCH including the DCI. The j value may be determined according to the capability of the UE.

According to another embodiment, the slot for the PUSCH transmission at the UE receiving the UL grant DCI at the n-th slot #n may be determined according to either information on a time domain PUSCH resource allocation transmitted through the UL grant DCI or configuration information on transmission timing relationship between the UL grant DCI configured through the RRC signaling and the PUSCH. For example, the information on the time domain PUSCH resource allocation may be configuration information on timing gap between transmission/reception of the UL grant DCI and the PUSCH. When the slot for the PUSCH transmission is the slot #(n+j1), the UL BWP switching may be performed at the slot # (n+j1−j2) before the j2 slot based on the slot # (n+j1) for the PUSCH transmission.

For example, if j2=0, the currently active UL BWP may be deactivated, and the new UL BWP indicated by the UL grant DCI may be activated from the slot for the PUSCH transmission.

The j2 value may be determined according to the capability of the UE. When the BWP transition time is determined according to the capability of the UE, the receiver 1530 may receive the corresponding capability for configuring the BWP transition time from the UE.

The transmitter 1520 may transmit the data channel through the newly active BWP according to the scheduling control information included in the DCI. In FIG. 11, it is shown that the BWP is switched immediately after the lapse of the k slot, which is the BWP transition time. For example, the switching of the BWP may be performed upon transmission of the data channel after the lapse of the k0 slot according to the scheduling control information.

For example, when the transmission time of the data channel according to the scheduling control information is before passing the BWP transition time from the reception time of the DCI, the BS may keep activating the currently active BWP.

As shown in FIG. 12, when the BWP transition time is determined according to the capability of the UE, the timing gap (for example, k0 value) between the DCI reception time indicated by information on a time domain resource allocation indicated by the DCI and the PDSCH reception time indicated by the DCI does not guarantee the BWP transition time k related capability reported by the UE, the BS may not perform the BWP switching according to the BWP switching indication of the DCI. The transmitter 1520 may keep the previous BWP and transmit the data channel from a point in time when a k0 slot defined by the scheduling control information has elapsed.

According to one embodiment, when the transmission time of the data channel according to the scheduling control information is before passing the BWP transition time from the reception time of the DCI, the transmitter 1520 may transmit the data channel through the activated predetermined default BWP. The k0 value is the timing gap between the DCI reception time and the data channel reception time by indicated the scheduling control information included in the DCI. As shown in FIG. 13, when the k0 value is ahead of the BWP transition time k indicated by the UE, the UE may not perform the BWP switching according to the indication of the DCI.

In this case, the transmitter 1520 may transceive the data channel through the activated predetermined default BWP. For example, when the BWP is switched as the default BWP at the lapse of the k slot, the receiver 1530 may receive information on being capable of receiving the data channel, or the receiver 1530 may receive the request for a DCI including new scheduling control information for the data channel, from the UE.

For example, the transition time kd is the time to switch the BWP to the default BWP according to the capability of the UE, and the transmission time kd may be set to be shorter than the normal BWP transition time k. In this case, if the kd is shorter than the k, the UE may switch the BWP to the default BWP at a time when the kd has elapsed after the PDCCH is received. In this case, when the k0 lapses, the transmitter 1520 may transmit the data channel through the default BWP.

According to one embodiment, when the transmission time of the data channel according to the scheduling control information is before passing the BWP transition time from the reception time of the DCI, the transmitter 1520 may transmit the data channel through the activated initial BWP. The k0 value is the timing gap between the DCI reception time and the data channel reception time by indicated the scheduling control information included in the DCI. As shown in FIG. 14, when the k0 value is ahead of the BWP transition time k indicated by the UE, the UE may not perform the BWP switching according to the indication of the DCI.

In this case, the transmitter 1520 may transmit the data channel through the activated initial BWP. For example, when the BWP is switched as the initial BWP at the lapse of the k slot, the receiver 1530 may receive information on being capable of receiving the data channel, or the receiver 1530 may receive the request for a DCI including new scheduling control information for the data channel, from the UE.

Alternatively, the transition time ki is the time to switch the BWP to the initial BWP according to the capability of the UE and the transition time ki may be set to be shorter than the normal BWP transition time k. In this case, if the ki is shorter than the k, the UE may switch the BWP to the initial BWP at a time when the ki has elapsed after the PDCCH is received. In this case, when the k0 lapses, the transmitter 1520 may transmit the data channel through the initial BWP.

Although FIGS. 11 to 14 illustrate transmission of the DL data channel, the same thing may be applied to transmission of the UL data channel. When the UL BWP switching is indicated through the UL grant DCI including the PUSCH scheduling control information, the UE may derive the UL BWP switching time for the UE based on the slot at which the PDCCH including the DCI is received. The currently active UL BWP is deactivated and the new UL BWP indicated by the UL grant DCI may be activated after the j slot from the slot at which the PDCCH including the DCI is received. The j value may be determined according to the capability of the UE.

The UE may not transmit the PUCCH or the PUSCH through the currently active UL BWP during the reception time of the DCI including the BWP switching indication information and the corresponding BWP transition time. Alternatively, whether to transmit the PUCCH or the PUSCH through the currently active BWP during the BWP transition time may be configured by the BS through the RRC signaling, the MAC CE signaling, physical layer control signaling, or by the UE capability.

Also, when the BWP transition time is determined according to the capability of the UE, the timing gap (for example, k2 value) between the DCI reception time indicated by information on a time domain resource allocation indicated by the DCI and the PUSCH reception time indicated by the DCI does not guarantee the BWP transition time related capability reported by the UE, the UE may not perform the BWP switching according to the BWP switching indication of the DCI.

As shown in FIGS. 12 to 14, the UL data channel may be transmitted through one of the previous active BWP, the newly activated default BWP and the newly activated initial BWP at the same situation as mentioned above. The receiver 1530 may receive the UL data channel through one of them.

When the new BWP indicated by the value of the BWP indication field is activated at the transition time described above, the BS transceives the data channel to and from the BS. According to this embodiment, the BWP switching may be efficiently performed according to the capability of the UE.

The transmitter 1520 and the receiver 1530 may transmit and receive the data channel with the UE when a new BWP part indicated by the value of the BWP indication field is activated at the transition time described above. According to this embodiment, the BWP switching may be efficiently performed according to the capability of the UE.

Each operation by the BS may be performed in another specific UE. In this case, according to one embodiment, the description described with reference to FIG. 6 may be applied substantially equally between one UE and another UE.

Figure 16:
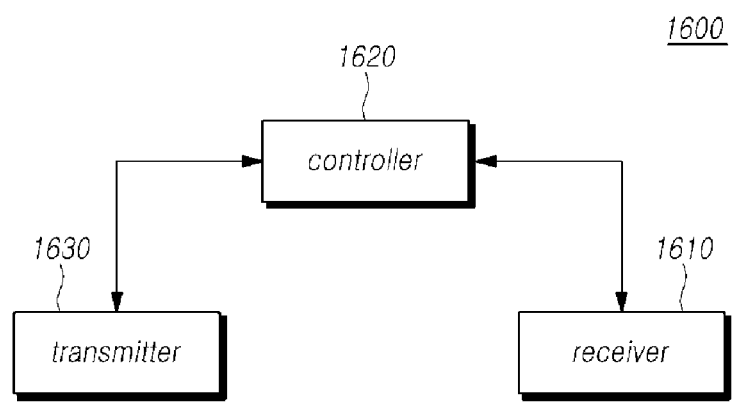
FIG. 16 is a diagram for showing a UE according to embodiments.

FIG. 16 illustrates a UE according to embodiments.

Referring to FIG. 16, a UE 1600 includes a receiver 1610, a controller 1620, and a transmitter 1630.

The controller 1620 may control general operations for the UE to transceive the data channel. The transmitter 1630 and the receiver 1620 are used in transmitting and receiving a signal, a message or data needed for materializing the present disclosure to and from the UE.

The receiver 1610 may receive, from the BS, the BWP configuration information on the BWP set configured with one or more BWPs with regard to the UE. The BWP configuration information may include index information for indicating each BWP of the BWP set configured with one or more BWPs configuration in terms of the UE.

The transmitter 1630 may transmit physical layer capability information including the BWP switching delay type information.

For example, a BWP switching delay (BWP switching delay) is the time taken to convert a BWP used for transmitting and receiving a data channel to another BWP. The BWP switching delay may be determined on the basis of the capability of the UE. According to the capability of the UE, the UE may be classified into any one of at least two predetermined BWP switching delay types.

When the DL BWP switching for the UE is indicated through the DCI, the controller 1620 may derive the DL BWP switching time of the UE based on a slot at which the PDCCH including the DCI is received. For example, the BWP switching delay type may be determined according to the DL BWP switching time of the UE.

For example, when the PDCCH including the DCI is received in n-th slot #n, it is assumed that the currently active DL BWP is deactivated and the new DL BWP indicated by the DCI may be activated from the slot # (n+k)

after the k slot from the slot #n. For example, the BWP transition time k, which is the time taken to switch the used BWP to another BWP, may be determined according to the capability of the UE.

As described above, when the BWP transition time is determined according to the capability of the UE, the transmitter 1530 may transmit the capability value of the UE for configuring the BWP transition time to the BS.

As described above, the capability value of the UE may be transmitted to the BS in order to switch the BWP used for wireless communication between the UE and the BS, but the embodiments of the present disclosure are not limited thereto. For example, the transmitter 1530 may transmit a capability value of the UE to another UE in order to switch the BWP used for wireless communication with another UE.

The receiver 1610 may receive the DCI including a BWP indication field indicating one BWP different from the active BWP among the one or more BWPs included in the BWP set configured for the UE. For example, the BWP indicated by the BWP indication field (BIF) may be configured to one at a specific time. For example, the number of DL BWPs and the number of UL BWPs that may be used by the UE may be configured up to N (N is a natural number equal to or greater than 1), respectively.

The receiver 1610 may receive the BIF indicating the BWP to be used for transmission/reception of the data channel among the BWPs included in the BWP set configured for the UE through the DL assignment DCI.

For example, the DL BWP switching may be indicated through the DL assignment DCI including the resource allocation information for the PDSCH. In this case, the DL assignment DCI format configured for monitoring at the UE may include the DL BWP indication field (DL BIF) for the DL BWP switching.

Whether to include the DL BIF in the DL assignment DCI format may be determined according to the type of the DL assignment DCI format. For example, the DL BIF may be included in the DL assignment DCI format to be monitored by the UE in order to receive the PDSCH scheduling control information only when the DL assignment DCI format is the DCI format 1_1 among the DCI format 1_0 and the DCI format 1_1. Referring to FIG. 9, the receiver 1610 may receive the DCI format 1_1 including the DL BIF and the PDSCH scheduling control information from the BS.

For example, the UL BWP switching may be indicated through the UL grant DCI including the resource allocation information for the PUSCH. In this case, the UL grant DCI format configured for monitoring at the UE may include the UL BWP indication field (UL BIF) for the UL BWP switching.

Whether to include the UL BIF in the UL grant DCI format may be determined according to either the type or the size of the UL grant DCI format. For example, the UL BIF may be included in the UL grant DCI format to be monitored by the UE in order to receive the PUSCH scheduling control information only when the UL grant DCI format is the DCI format 0_1 among the DCI format 0_0 and the DCI format 0_1. Referring to FIG. 10, the receiver 1610 may receive the DCI format 1_1 including the UL BIF and the PUSCH grant information from the BS.

For example, the BIF may be determined according to the number of the BWPs, the N value, included in the BWP set configured for the UE in the serving cell as shown in FIG. 4. The BIF may be configured with a BWP index of log 2(N) bits which indicates an activated BWP. If N=4, the log 2(4) bits=2 and the BWP index of the BIF is one of "00", "01", "10", and "11".

The BIF be may be configured with a BWP index of log 2(N+1) bits which indicates non-switching (i.e., maintaining the current active BWP) (for example, all of log 2(N+1) bits are 'zero') as well as a newly activated BWP.

If N=<3, the BIF be may be configured with may be configured with the BWP index of log 2(N+1) bits. If N=4, the BIF be may be configured with may be configured with the BWP index of log 2(N) bits. For example, if N=1, N=2, N=3 and N=4, the BIF is configured with may be configured with the BWP index of 1 bit, 2 bits, 2 bits and 2 bits, respectively.

In the above-mentioned, the receiver 1610 may receive the BIF indicating the BWP to be newly activated from the BS for switching the BWP, but the embodiments of the present disclosure are is not limited to thereto. For example, the receiver 1610 may receive a BIF indicating the BWP to be newly activated from another UE that has transmitted the capacity value of the UE.

The controller 1620 may activate the BWP indicated by the value of the BWP indication field in the UE and control the transmitter 1630 and the receiver 1610 in order to transceive the data channel.

When the DL BWP switching for the UE is indicated through the DCI, the UE may derive the DL BWP switching time of the UE based on a slot at which the PDCCH including the DCI is received. Referring to FIG. 11, the controller 1620 deactivates the currently active DL BWP and activates the new DL BWP indicated by the DCI after the k slot from the slot at which the PDCCH including the DCI is received. For example, the BWP transition time k may be determined according to the capability of the UE.

According to the other embodiment, the information on the time domain PDSCH resource allocation may be configuration information on timing gap between transmission/reception of the DL assignment DCI and the PDSCH. When the slot for the PDSCH transmission is the slot # (n+k1), the controller 1620 may perform the DL BWP switching at the slot # (n+k1−k2) before the k2 slot based on the slot # (n+k1) for the PDSCH transmission. For example, if k2=0, the controller 1620 may deactivate the currently active DL BWP and may activate the new DL BWP indicated by the DL assignment DCI from the slot for the PDSCH transmission.

When the k2 value is determined according to the capability of the UE, the transmitter 1630 may report the corresponding capability for configuring the BWP transition time to the BS.

When the BS indicates the UL BWP switching through the UL grant DCI including the PUSCH scheduling control information, the controller 1620 may derive the UL BWP switching time for the UE based on the slot at which the PDCCH including the DCI is received. The controller 1620 may deactivate the currently active UL BWP and activate the new UL BWP indicated by the UL grant DCI after the j slot from the slot of receiving the PDCCH including the DCI. The j value may be determined according to the capability of the UE. Herein, the BWP transition time is determined according to the capability of the UE.

According to another embodiment, the slot for the PUSCH transmission at the UE receiving the UL grant DCI at the n-th slot #n may be determined according to either information on a time domain PUSCH resource allocation transmitted through the UL grant DCI or configuration information on transmission timing relationship between the UL grant DCI configured through the RRC signaling and the PUSCH. For example, the information on the time domain PUSCH resource allocation may be configuration information on timing gap between transmission/reception of the UL grant DCI and the PUSCH. When the slot for the PUSCH transmission is the slot #(n+j1), the UL BWP switching may be performed at the slot # (n+j1−j2) before the j slot based on the slot # (n+j1) for the PUSCH transmission.

For example, if j2=0, the controller 1620 may deactivate the currently active UL BWP and activate the new UL BWP indicated by the UL grant DCI from the slot for the PUSCH transmission.

The j2 value may be determined according to the capability of the UE. When the BWP transition time is determined according to the capability of the UE, the transmitter 1630 may report the corresponding capability for configuring the BWP transition time to the BS.

For example, when the transmission time of the data channel according to the scheduling control information is before passing the BWP transition time from the reception time of the DCI, the controller 1620 may keep activating the currently active BWP.

As shown in FIG. 12, when the BWP transition time is determined according to the capability of the UE, the timing gap (for example, k0 value) between the DCI reception time indicated by information on a time domain resource allocation indicated by the DCI and the PDSCH reception time indicated by the DCI does not guarantee the BWP transition time k related capability reported by the UE, the controller 1620 may not perform the BWP switching according to the BWP switching indication of the DCI. The controller 1620 may keep the previous BWP and the receiver 1610 receives the data channel from a point in time when a k0 slot defined by the scheduling control information has elapsed.

According to one embodiment, when the transmission time of the data channel according to the scheduling control information is before passing the BWP transition time from the reception time of the DCI, the controller 1620 may activate a predetermined default BWP. The k0 value is the timing gap between the DCI reception time and the data channel reception time by indicated the scheduling control information included in the DCI. As shown in FIG. 13, when the k0 value is ahead of the BWP transition time k indicated by the UE, the controller 1620 may not perform the BWP switching according to the indication of the DCI.

In this case, the controller 1620 may activate a predetermined default BWP and the receiver 1610 may receive the data channel through the predetermined default BWP. For example, when the BWP is switched as the default BWP at the lapse of the k slots, the transmitter 1630 may transmit information on being capable of receiving the data channel, or may request a DCI including new scheduling control information for the data channel, to the BS.

For example, the transition time kd is the time to switch the BWP to the default BWP according to the capability of the UE. The transmission time kd may be set to be shorter than the normal BWP transition time k. In this case, if the kd is shorter than the k, the controller 1620 may switch the BWP to the default BWP at a time when the kd has elapsed after the PDCCH is received.

According to one embodiment, when the transmission time of the data channel according to the scheduling control information is before passing the BWP transition time from the reception time of the DCI, the controller 1620 may activate an initial BWP configured for the initial random access operation. The k0 value is the timing gap between the DCI reception time and the data channel reception time by indicated the scheduling control information included in the DCI. As shown in FIG. 14, when the k0 value is ahead of the BWP transition time k indicated by the UE, the controller 1620 may not perform the BWP switching according to the indication of the DCI.

In this case, the controller 1620 may activate a predetermined initial BWP and transceive the data channel through the activated predetermined initial BWP. For example, when the BWP is switched as the initial BWP at the lapse of the k slots, the transmitter 1630 may transmit information on being capable of receiving the data channel, or may request a DCI including new scheduling control information for the data channel, to the BS.

Alternatively, for example, the transition time ki is the time to switch the BWP to the initial BWP according to the capability of the UE. The transition time ki may be set to be shorter than the normal BWP transition time k. In this case, if the kd is shorter than the k, the controller 1620 may switch the BWP to the initial BWP at a time when the ki has elapsed after the PDCCH is received.

Although FIGS. 11 to 14 illustrate transmission of the DL data channel, the same thing may be applied to transmission of the UL data channel. When the UL BWP switching is indicated through the UL grant DCI including the PUSCH scheduling control information, the controller 1620 may derive the UL BWP switching time for the UE based on the slot at which the PDCCH including the DCI is received. The controller 1620 may deactivate the currently active UL BWP and activate the new UL BWP indicated by the UL grant DCI after the j slot from the slot at which the PDCCH including the DCI is received. The j value may be determined according to the capability of the UE. Herein, the BWP transition time is determined according to the capability of the UE.

The controller 1620 may not transmit the PUCCH or the PUSCH through the currently active UL BWP during the reception time of the DCI including the BWP switching indication information and the corresponding BWP transition time. Alternatively, whether or not the PUCCH or the PUSCH is transmitted through the currently active BWP during the BWP transition time may be configured by the BS through the RRC signaling, the MAC CE signaling, physical layer control signaling, or by the UE capability.

Also, when the BWP transition time is determined according to the capability of the UE, the timing gap (for example, k2 value) between the DCI reception time indicated by information on a time domain resource allocation indicated by the DCI and the PUSCH reception time indicated by the DCI does not guarantee the BWP transition time related capability reported by the UE, the controller 1620 may not perform the BWP switching according to the BWP switching indication of the DCI.

As shown in FIGS. 12 to 14, the controller 1620 may switch the BWP to one of the previous active BWP, the newly activated default BWP and the newly activated initial BWP at the same situation as mentioned above. The transmitter 1630 may transmit the UL data channel through one of them.

The controller 1620 may activate the new BWP and transceive the data channel to and from the BS. According to this embodiment, the BWP switching may be efficiently performed according to the capability of the UE.

In the above-mentioned, the controller 1620 may activate the indicated new BWP and control transceive the data channel through the newly activated BWP between the UE and the BS, but the embodiments of the present disclosure are is not limited thereto. For example, the controller 1620 may transmit and receive a data channel through a newly activated BWP to another UE.

The above embodiments of the present disclosure have been described only for illustrative purposes, and those skilled in the art will appreciate that various modifications and changes may be made thereto without departing from the scope and spirit of the present disclosure. Therefore, the embodiments of the present disclosure are not intended to limit, but are intended to illustrate the technical idea of the present disclosure, and the scope of the technical idea of the present disclosure is not to be limited by the embodiments. The scope of the present disclosure shall be construed on the basis of the accompanying claims in such a manner that all of the technical ideas included within the scope equivalent to the claims belong to the present disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of switching a bandwidth part (BWP) by a user equipment (UE), the method comprising:
   transmitting information on physical layer capability, which includes information on a BWP switching delay type;
   receiving downlink control information (DCI) including a BWP indication field that indicates one BWP different from an active BWP among BWPs included in a BWP set configured for the UE, and scheduling control information for a data channel;
   activating a BWP indicated by a value of the BWP indication field in consideration of a transition time determined by the information on the BWP switching delay type; and
   transceiving the data channel according to the scheduling control information,
   wherein the activating the BWP comprises:
   activating the indicated BWP when transmission time of the data channel according to the scheduling control information is after passing the transition time from a reception time of the DCI.

2. The method according to claim 1, wherein the BWP indication field comprises a number of bits determined by the number of BWPs included in the BWP set configured by the BWP configuration information received through higher layer signaling.

3. The method according to claim 2, wherein the value of the BWP indication field is determined by log 2(N) bit or log 2(N+1) bit when the number of BWPs is N.

4. The method according to claim 1, wherein whether to include the BWP indication field in the DCI is determined according to DCI format.

5. The method according to claim 1, wherein the activating the BWP comprises:
   maintaining activating the active BWP when the transmission time of the data channel according to the scheduling control information is before passing the transition time from the reception time of the DCI.

6. A method of switching bandwidth part (BWP) by a base station (BS), the method comprising:
   receiving information on physical layer capability that includes information on a BWP switching delay type, from a UE;
   transmitting downlink control information (DCI) including a BWP indication field that indicates one BWP different from an active BWP among BWPs included in a BWP set configured for the UE, and scheduling control information for a data channel; and
   transceiving the data channel according to the scheduling control information if a BWP indicated by a value of the BWP indication field is activated in consideration of a transition time determined by the information on the BWP switching delay type,
   wherein the transceiving the data channel comprises:
   transmitting and receiving the data channel if the BWP indicated by the value of the BWP indication field is activated when transmission time of the data channel according to the scheduling control information is after passing the transition time from a reception time of the DCI.

7. The method according to claim 6, wherein the BWP indication field comprises a number of bits determined by the number of BWPs included in the BWP set configured by the BWP configuration information received through higher layer signaling.

8. The method according to claim 7, wherein the value of the BWP indication field is determined by log 2(N) bit or log 2(N+1) bit when the number of BWPs is N.

9. The method according to claim 6, wherein whether to include the BWP indication field in the DCI is determined according to DCI format.

10. The method according to claim 6, wherein the transceiving the data channel comprises:
    transmitting and receiving the data channel through the BWP in which the activation is maintained when the transmission time of the data channel according to the scheduling control information is before passing the transition time from the reception time of the DCI.

11. A user equipment (UE) for switching bandwidth part (BWP), the UE comprising
    a transmitter configured to transmit information on physical layer capability comprising information on a BWP switching delay type;
    a receiver configured to receive downlink control information (DCI) comprising a BWP indication field that indicates one BWP different from an active BWP among BWPs included in a BWP set configured for the UE, and scheduling control information for a data channel; and
    a controller configured to activate the BWP indicated by a value of the BWP indication field in consideration of a transition time determined by the information on the BWP switching delay type, and controls the transmitter and the receiver to transmit and receive the data channel according to the scheduling control information,
    wherein the controller activates the BWP indicated by the value of the BWP indication field when the transmission time of the data channel according to the scheduling control information is after transition time has elapsed based on reception time of the DCI.

12. The UE according to claim 11, wherein the BWP indication field comprises a number of bits determined by the number of BWPs included in the BWP set configured by the BWP configuration information received through higher layer signaling.

13. The UE according to claim 12, wherein the value of the BWP indication field is determined by log 2(N) bit or log 2(N+1) bit when the number of BWPs is N.

14. The UE according to claim 11, wherein whether to include the BWP indication field in the DCI is determined according to DCI format.

15. The UE according to claim 11, wherein the controller maintains activating the active BWP when the transmission time of the data channel according to the scheduling control information is before passing the transition time from the reception time of the DCI.

\* \* \* \* \*